US012669998B2

(12) United States Patent (10) Patent No.: US 12,669,998 B2

Tagata et al. (45) Date of Patent: Jun. 30, 2026

(54) DATA PROCESSING DEVICE

(71) Applicants:Preferred Networks, Inc., Tokyo (JP);
**NATIONAL UNIVERSITY
CORPORATION KOBE
UNIVERSITY**, Hyogo (JP)

(72) Inventors: Kenji Tagata, Tokyo (JP); **Junichiro
Makino**, Hyogo (JP)

(73) Assignees: Preferred Networks, Inc., Tokyo (JP);
**NATIONAL UNIVERSITY
CORPORATION KOBE
UNIVERSITY**, Tokyo (JP)

( * ) Notice: Subject to any disclaimer, the term of this
patent is extended or adjusted under 35
U.S.C. 154(b) by 0 days.

(21) Appl. No.: 18/612,252

(22) Filed: Mar. 21, 2024

(65) Prior Publication Data

US 2024/0320007 A1 Sep. 26, 2024

(30) Foreign Application Priority Data

Mar. 24, 2023 (JP) ................................. 2023-048896

(51) Int. Cl.
G06F 9/38 (2018.01)

(52) U.S. Cl.
CPC .......... G06F 9/3836 (2013.01); G06F 9/3854
(2023.08)

(58) Field of Classification Search
CPC .............................. G06F 9/3836; G06F 9/3854
See application file for complete search history.

(56) References Cited

U.S. PATENT DOCUMENTS

| | | | | |
|---|---|---|---|---|
| 8,108,652 B1 * | 1/2012 | Hui | .......................... | G06F 9/383 |
| | | | | 712/4 |
| 2001/0034826 A1 * | 10/2001 | Roussel | ................ | G06F 9/3828 |
| | | | | 712/225 |
| 2003/0115493 A1 * | 6/2003 | Wong | ......................... | G06F 1/10 |
| | | | | 713/322 |
| 2003/0212917 A1 * | 11/2003 | Yoshitomi | ................. | G06F 1/10 |
| | | | | 713/400 |
| 2006/0242386 A1 * | 10/2006 | Wood | .................... | G06F 9/3869 |
| | | | | 712/E9.035 |
| 2013/0166952 A1 * | 6/2013 | Schon | ................... | G06F 9/3861 |
| | | | | 714/E11.138 |
| 2021/0318883 A1 * | 10/2021 | Xu | ......................... | G06F 9/3858 |
| 2024/0104049 A1 * | 3/2024 | Rijshouwer | ......... | G06F 9/30149 |
| 2024/0289130 A1 * | 8/2024 | Shen | ................... | G06F 9/30098 |

FOREIGN PATENT DOCUMENTS

JP H05-101207 4/1993

* cited by examiner

*Primary Examiner* — Michael J Metzger
(74) *Attorney, Agent, or Firm* — IPUSA, PLLC

(57) ABSTRACT

A data processing device includes an instruction issue circuit
configured to issue instructions; a plurality of execution
circuits configured to execute, in parallel, the instructions
issued from the instruction issue circuit; and a plurality of
delay circuits configured to delay arrival timings of when the
instructions issued from the instruction issue circuit arrive at
the plurality of execution circuits, the plurality of delay
circuits being arranged between the instruction issue circuit
and the plurality of execution circuits. The arrival timings of
the instructions arriving at at least two execution circuits
included in the plurality of execution circuits are different
from each other.

30 Claims, 12 Drawing Sheets

DATA PROCESSING DEVICE

CROSS-REFERENCE TO RELATED
APPLICATIONS

This patent application is based on and claims priority to Japanese Patent Application No. 2023-048896 filed on Mar. 24, 2023, the entire contents of which are incorporated herein by reference.

TECHNICAL FIELD

The present disclosure relates to a data processing device.

BACKGROUND

With the development of semiconductor processes, power consumption of semiconductor devices tends to increase. Recently, semiconductor devices with power consumption exceeding 500 W have been developed. When internal circuits mounted on a semiconductor device having large power consumption are simultaneously operated or simultaneously stopped, the power consumption rapidly increases or decreases. When the power consumption rapidly increases or decreases, a voltage drop or a voltage rise may occur instantaneously, and a power supply noise may be generated. The power supply noise tends to increase as the power consumption of the semiconductor device increases. Additionally, in a device on which multiple semiconductor devices are mounted, the power supply noise tends to increase as the power consumption of the mounted semiconductor devices increases.

SUMMARY

A data processing device according to an embodiment of the present disclosure includes an instruction issue circuit configured to issue instructions; a plurality of execution circuits configured to execute, in parallel, the instructions issued from the instruction issue circuit; and a plurality of delay circuits configured to delay arrival timings of when the instructions issued from the instruction issue circuit arrive at the plurality of execution circuits, the plurality of delay circuits being arranged between the instruction issue circuit and the plurality of execution circuits. The arrival timings of the instructions arriving at at least two execution circuits included in the plurality of execution circuits are different from each other.

BRIEF DESCRIPTION OF THE DRAWINGS

Figure 6:
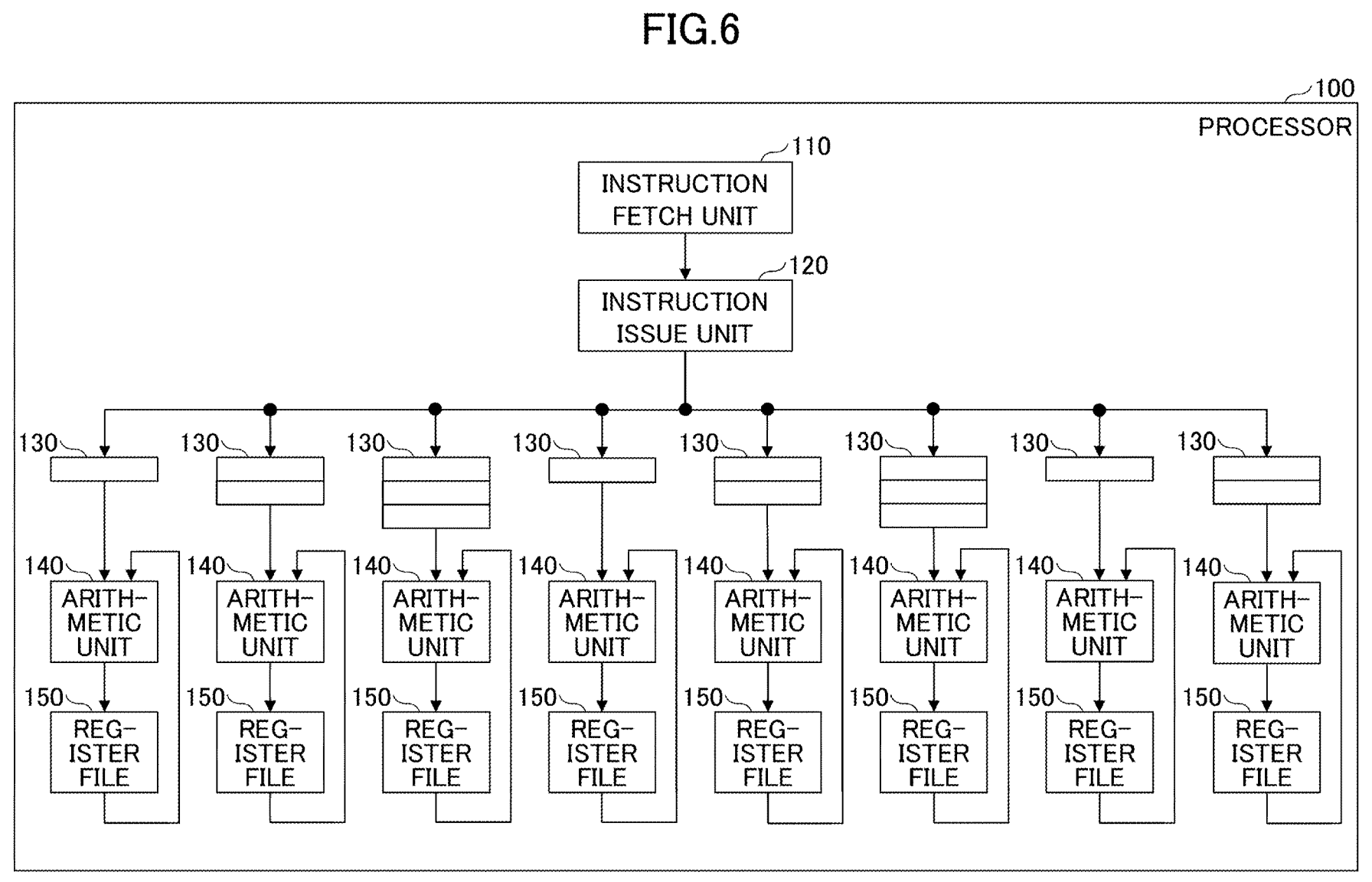

FIG. 6 is an explanatory diagram illustrating an example of a delay amount of the delay unit in FIG. 1;

2

Figure 1:
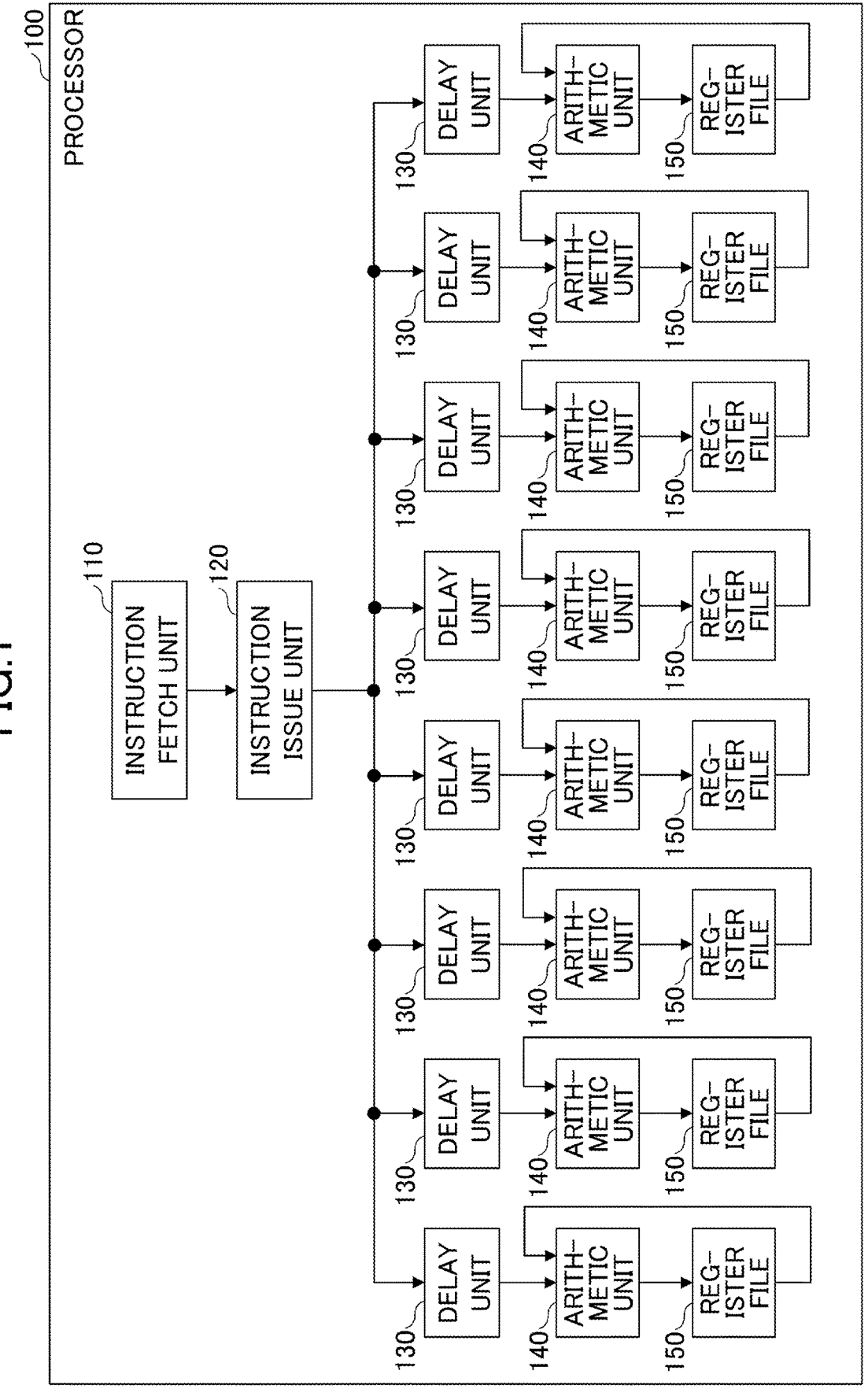
FIG. 1 is a block diagram illustrating an example of a configuration of a processor according to an embodiment of a data processing device of the present disclosure.
Figure 8:
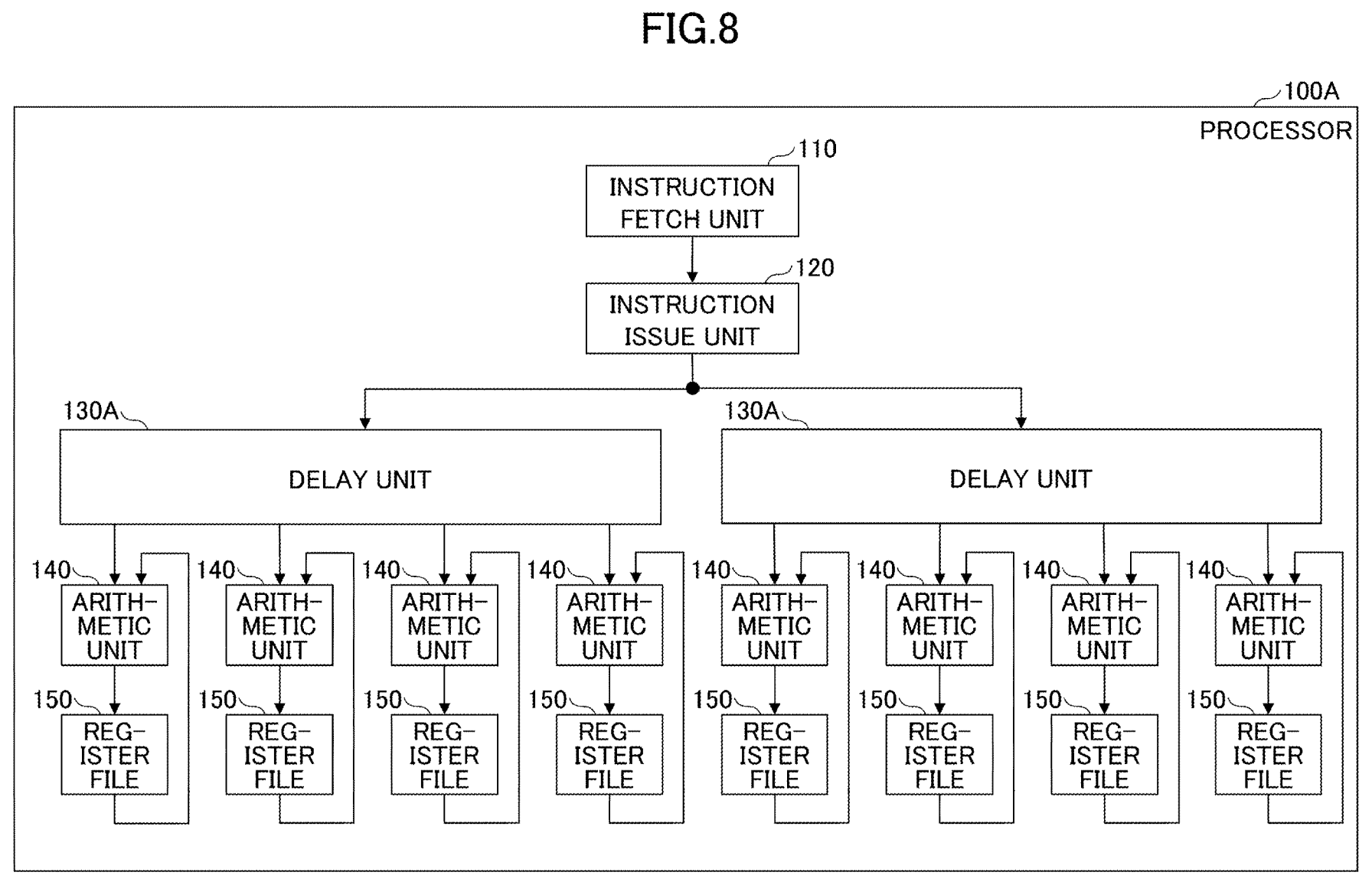
Figure 9:
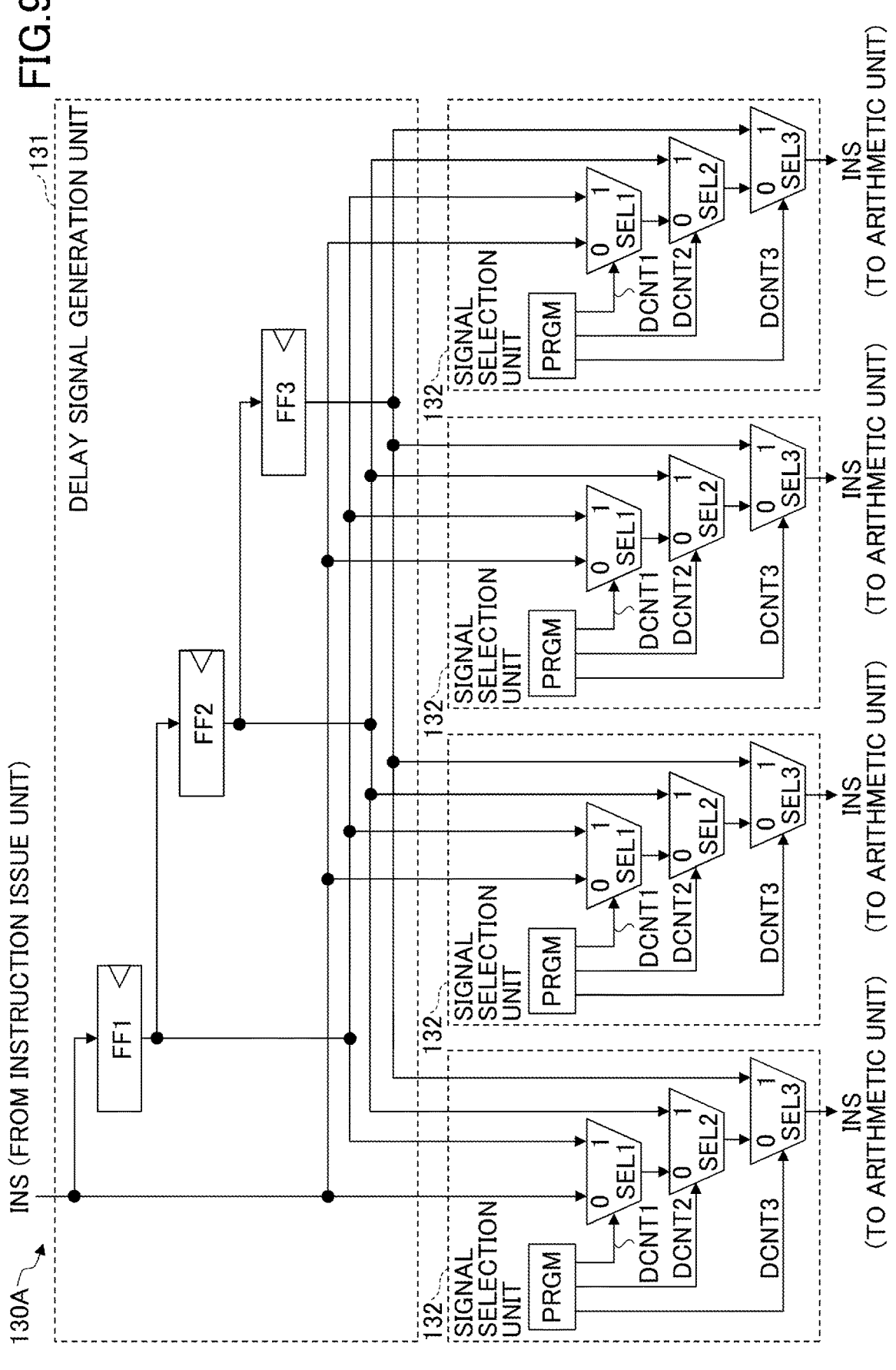
Figure 10:
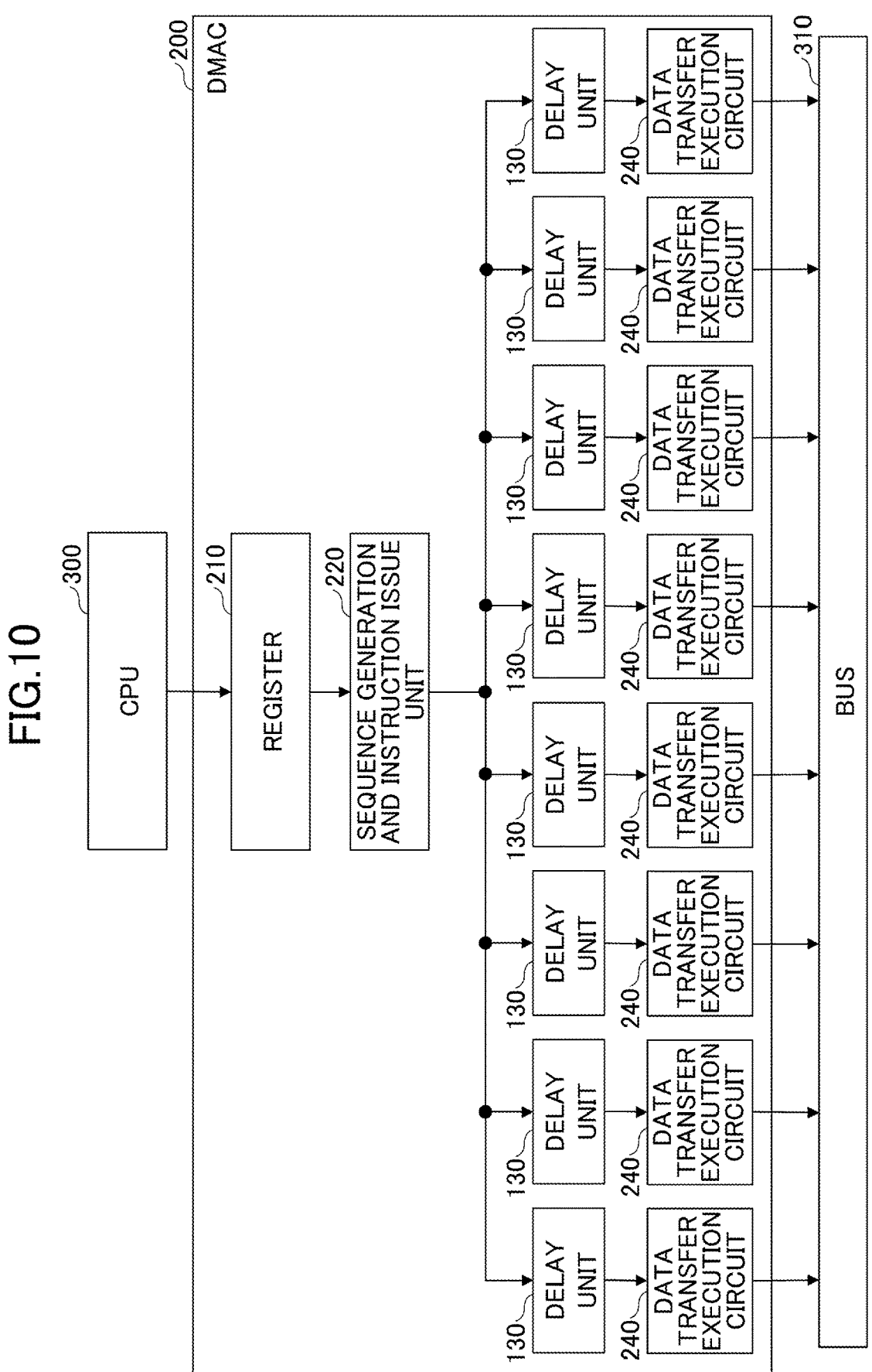
Figure 11:
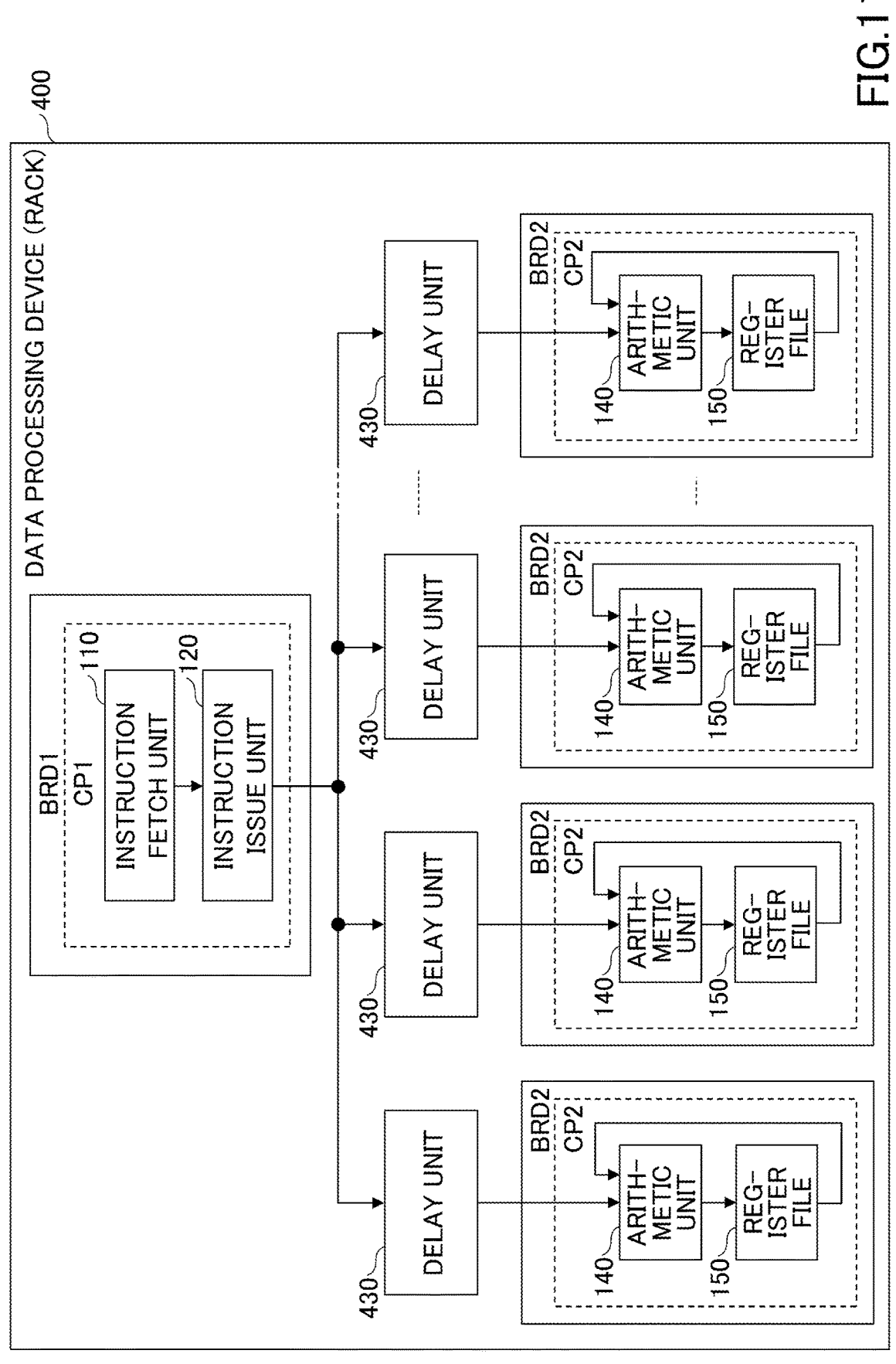

FIG. 8 is a block diagram illustrating an example of a configuration of a processor according to another embodiment of the data processing device of the present disclosure;

FIG. 9 is a circuit diagram illustrating an example of a delay unit of FIG. 8;

FIG. 10 is a block diagram illustrating an example of a configuration of a DMAC according to another embodiment of the data processing device of the present disclosure;

FIG. 11 is a block diagram illustrating still another embodiment of the data processing device of the present disclosure; and FIG. 12 is a block diagram illustrating an example of a hardware configuration of a computer on which the processor illustrated in FIG. 1 is mounted.

DETAILED DESCRIPTION OF EMBODIMENTS

In the following, embodiments of the present disclosure will be described in detail with reference to the drawings. In the following description, a reference symbol the same as a name of a signal is used for a signal line through which the signal is transmitted. Although not particularly limited, a processor described below is mounted on a computer, such as a server, and executes a program to perform a convolution operation or the like in training or inference of a deep neural network. Here, the processor described below may be used for science and technology calculation or the like.

FIG. 1 is a block diagram illustrating an example of a configuration of a processor according to an embodiment of a data processing device of the present disclosure. A processor 100 illustrated in FIG. 1 includes an instruction fetch unit 110, an instruction issue unit 120, multiple delay units 130, multiple arithmetic units 140, and multiple register files 150. Here, the instruction fetch unit 110, the instruction issue unit 120, the delay unit 130, and the arithmetic unit 140 may be implemented as an instruction fetch circuit 110, an instruction issue circuit 120, a delay circuit 130, and an arithmetic circuit 140.

For example, the processor 100 is a single instruction multiple data (SIMD) type processor or a single instruction multiple threads (SIMT) type processor. The processor 100 is an example of a data processing device configured to process data. Here, FIG. 1 mainly illustrates elements included in a processor core of the processor 100. The processor 100 may include an instruction cache, a data cache, an internal memory, and the like in addition to the elements illustrated in FIG. 1.

An output of the instruction fetch unit 110 is connected to an input of the instruction issue unit 120. The instruction fetch unit 110 fetches an instruction held in a memory, an instruction cache, or the like, which is not illustrated, and transfers the fetched instruction to the instruction issue unit 120.

An output of the instruction issue unit 120 is connected in common to inputs of the delay units 130. The instruction issue unit 120 outputs the instructions transferred from the instruction fetch unit 110 to the delay units 130 in parallel.

For example, the instruction output from the instruction issue unit 120 is output to the delay unit 130 as a control signal for controlling the arithmetic unit 140 and the register file 150.

Here, the instruction issue unit 120 may include an instruction decoder configured to decode the instruction transferred from the instruction fetch unit 110. Additionally, the instruction issue unit 120 may include an instruction buffer configured to hold multiple instructions and an instruction scheduler configured to issue the instructions held in the instruction buffer in the order in which the instructions can be issued.

Outputs of the delay units 130 are connected to inputs of the corresponding arithmetic units 140. Each of the delay units 130 delays outputting, to the corresponding arithmetic unit 140, the instruction received from the instruction issue unit 120 by a predetermined amount. That is, the delay units 130 delays a timing when the instruction (control information included in the instruction) itself arrives at the arithmetic unit 140. This allows the delay mechanism of the instruction to be easily configured in comparison with a case of controlling the timing when the instruction arrives at the arithmetic unit 140 by using a timer or the like. An example of a delay amount set in each of the delay units 130 will be described with reference to FIG. 6.

An output of the arithmetic unit 140 is connected to an input of the corresponding register file 150. Each of the arithmetic units 140 executes the instruction supplied from the corresponding delay unit 130 and outputs data that is an execution result of the instruction to the register file 150. Here, each of the arithmetic units 140 may include multiple types of arithmetic units (an adder, a multiplier, a product-sum arithmetic unit, and the like) respectively corresponding to multiple types of instructions issued from the instruction issue unit 120. The arithmetic unit 140 is an example of an execution circuit configured to execute an arithmetic instruction.

An output of the register file 150 is connected to the input of the corresponding arithmetic unit 140. Here, each of the register files 150 includes multiple registers. Each of the registers inputs and outputs data to and from a memory, a data cache, or the like, which is not illustrated. Additionally, each of the registers holds an operation result from the corresponding arithmetic unit 140 and outputs the held data to the corresponding arithmetic unit 140. Here, a register file common to the multiple arithmetic units 140 may be provided instead of the multiple register files 150 illustrated in FIG. 1.

In FIG. 1, the processor 100 includes eight arithmetic blocks each including the delay unit 130, the arithmetic unit 140, and the register file 150, but the number of the arithmetic blocks may be two or greater.

Figure 2:
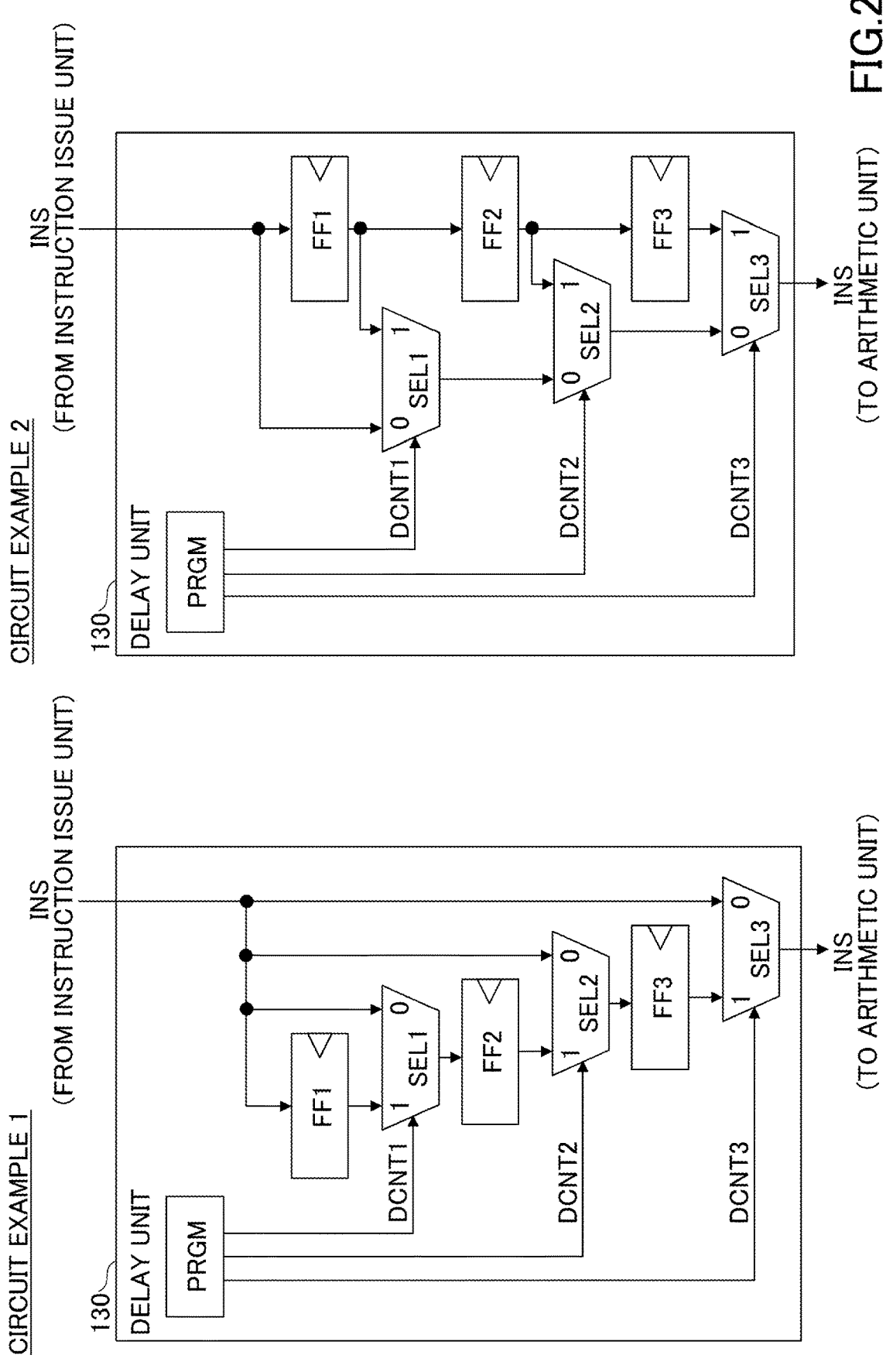
FIG. 2 is a circuit diagram illustrating an example of a delay unit of FIG. 1.

FIG. 2 is a circuit diagram illustrating an example of the delay unit 130 of FIG. 1. Each of the delay units 130 illustrated as the circuit example 1 and the circuit example 2 in FIG. 2 includes multiple flip-flops FF (FF1, FF2, and FF3), multiple selectors SEL (SEL1, SEL2, and SEL3), and a program circuit PRGM.

In the delay unit 130 of the circuit example 1, the flip-flops FF and the selectors SEL are alternately arranged between the instruction issue unit 120 and the arithmetic unit 140. In the delay unit 130 of the circuit example 2, the flip-flops FF are arranged in series and the selectors SEL are arranged in series. Each of the flip-flops FF outputs a received instruction INS with a delay of a delay amount of one unit (one clock cycle). Hereinafter, the delay amount of one unit is also referred to as the delay amount 1, the delay amount of two units is also referred to as the delay amount 2, and the delay amount of three units is also referred to as the delay amount 3. The delay amount of "O" is also referred to as the delay amount 0. A triangle mark illustrated in the flip-flop FF indicates a clock input terminal.

Hereinafter, the flip-flop FF or the selector SEL arranged relatively closer to the instruction issue unit 120 is also referred to as the flip-flop FF or the selector SEL at a previous stage. The flip-flop FF or the selector SEL arranged relatively closer to the arithmetic unit 140 is also referred to as the flip-flop FF or the selector SEL at a subsequent stage.

In the circuit example 1, an input terminal 1 of each of the selectors SEL receives the instruction INS output from the flip-flop FF at the previous stage. An input terminal 0 of each of the selectors SEL receives the instruction INS from the instruction issue unit 120. When a corresponding delay control signal DCNT1 or DCNT2 is logic 1, the selector SELL or SEL2 outputs the instruction INS output from the flip-flop FF at the previous stage to the flip-flop FF at the subsequent stage. When the corresponding delay control signal DCNT1 or DCNT2 is logic 0, the selector SELL or SEL2 outputs the instruction INS output from the instruction issue unit 120 to the flip-flop FF at the subsequent stage.

When a delay control signal DCNT3 is logic 1, a selector SEL3 outputs the instruction INS output from a flip-flop FF3 to the arithmetic unit 140. When the delay control signal DCNT3 is logic 0, the selector SEL3 outputs the instruction INS output from the instruction issue unit 120 to the arithmetic unit 140.

In the circuit example 2, the input terminal 0 of the selector SEL1 receives the instruction INS from the instruction issue unit 120. The input terminals 0 of the selectors SEL2 and SEL3 respectively receive the instructions INS output from the selectors SEL1 and SEL2 at the previous stage. The input terminals 1 of the selectors SEL1 to SEL3 respectively receive the instructions INS output from the flip-flops FF1 to FF3.

When the delay control signal DCNT1 is logic 1, the selector SELL outputs the instruction INS output from the flip-flop FF1 to the selector SEL2. When the delay control signal DCNT1 is logic 0, the selector SEL1 outputs the instruction INS output from the instruction issue unit 120 to the selector SEL2.

When the delay control signal DCNT2 is logic 1, the selector SEL2 outputs the instruction INS output from the flip-flop FF2 to the selector SEL3. When the delay control signal DCNT2 is logic 0, the selector SEL2 outputs the instruction INS output from the selector SEL1 to the selector SEL3.

When the delay control signal DCNT3 is logic 1, the selector SEL3 outputs the instruction INS output from the flip-flop FF3 to the arithmetic unit 140. When the delay control signal DCNT3 is logic 0, the selector SEL3 outputs the instruction INS output from the selector SEL2 to the arithmetic unit 140.

The program circuit PRGM stores the logical values of the delay control signals DCNT (DCNT1 to DCNT3) and outputs the delay control signals DCNT having the stored logical values. Although not particularly limited, for example, the program circuit PRGM is a non-volatile memory, such as a read only memory (ROM), an eFUSE, or the like. The program circuit PRGM is an example of a delay amount hold unit (i.e., a delay amount hold circuit) configured to hold delay amount information indicating a delay amount to be set in the delay unit 130.

Here, when the delay amount once having been determined is not changed, each of delay control signal lines DCNT1 to DCNT3 for respectively transmitting the delay control signals DCNT1 to DCNT3 may be connected to a power supply line or a ground line, instead of providing the program circuit PRGM in each of the delay units 130. In this case, each of the delay control signal lines DCNT1 to DCNT3 may be connected to an external terminal (a power supply terminal or a ground terminal) of the processor 100, or may be formed as a power supply line pattern or a ground line pattern on a photomask used for manufacturing the processor 100.

Four delay amounts from the delay amount 0 to the delay amount 3 can be set in the delay units 130 by changing the number of flip-flops FF connected in series to pass the instruction INS according to the logical values of the delay control signals DCNT1 to DCNT3 output from the program circuit PRGM. For example, in the circuit example 1, the logical values of the delay control signals DCNT1, DCNT2, and DCNT3 are set as "X, X, 0", "X, 0, 1", "0, 1, 1", or "1, 1, 1". "X" indicates either "0" or "1". For example, in the circuit example 2, the logical values of the delay control signals DCNT1, DONT2, and DCNT3 are set as "0, 0, 0", "1, 0, 0", "X, 1, 0", or "X, X, 1".

Here, although FIG. 2 illustrates an example in which three flip-flops FF are provided in the delay unit 130 for the sake of simplicity of description, it is only necessary that the number of the flip-flops FF is more than one, and is determined in accordance with the maximum delay amount to be achieved and the cycle of the clock supplied to the flip-flops FF. For example, about 100 flip-flops FF may be provided in each of the delay units 130. Additionally, the clock supplied to the flip-flops FF may be a frequency-divided clock obtained by dividing the frequency of the operation clock of the processor.

For example, a frequency of a transfer clock supplied to a clock input terminal of the flip-flop FF is set to a frequency equal to the frequency of the operation clock of the arithmetic unit 140. Here, the frequency of the transfer clock may be set to $2^n$ times the frequency of the operation clock (n is a positive or negative integer). For example, when the frequency of the transfer clock is twice the frequency of the operation clock, the program circuit PRGM is configured such that an adjustment amount of the delay amount of the instruction INS is the delay amount 2 in order to shift the instruction INS output from the delay unit 130 by one cycle of the operation clock.

For example, when the frequency of the transfer clock is 0.5 times the frequency of the operation clock, the program circuit PRGM is configured such that the adjustment amount of the delay amount of the instruction INS is the delay amount 1 in order to shift the instruction INS output from the delay unit 130 by two cycles of the operation clock. As described above, even when the frequency of the transfer clock is $2^n$ times the frequency of the operation clock, the delay amount of the instruction INS can be set to m cycles (m is an integer of 1 or greater) of the operation clock by the setting of the program circuit PRGM. This allows a time difference between the arrivals of the instructions INS at the arithmetic units 140 to be a time period corresponding to at least one cycle of the operation clock.

Figure 3:
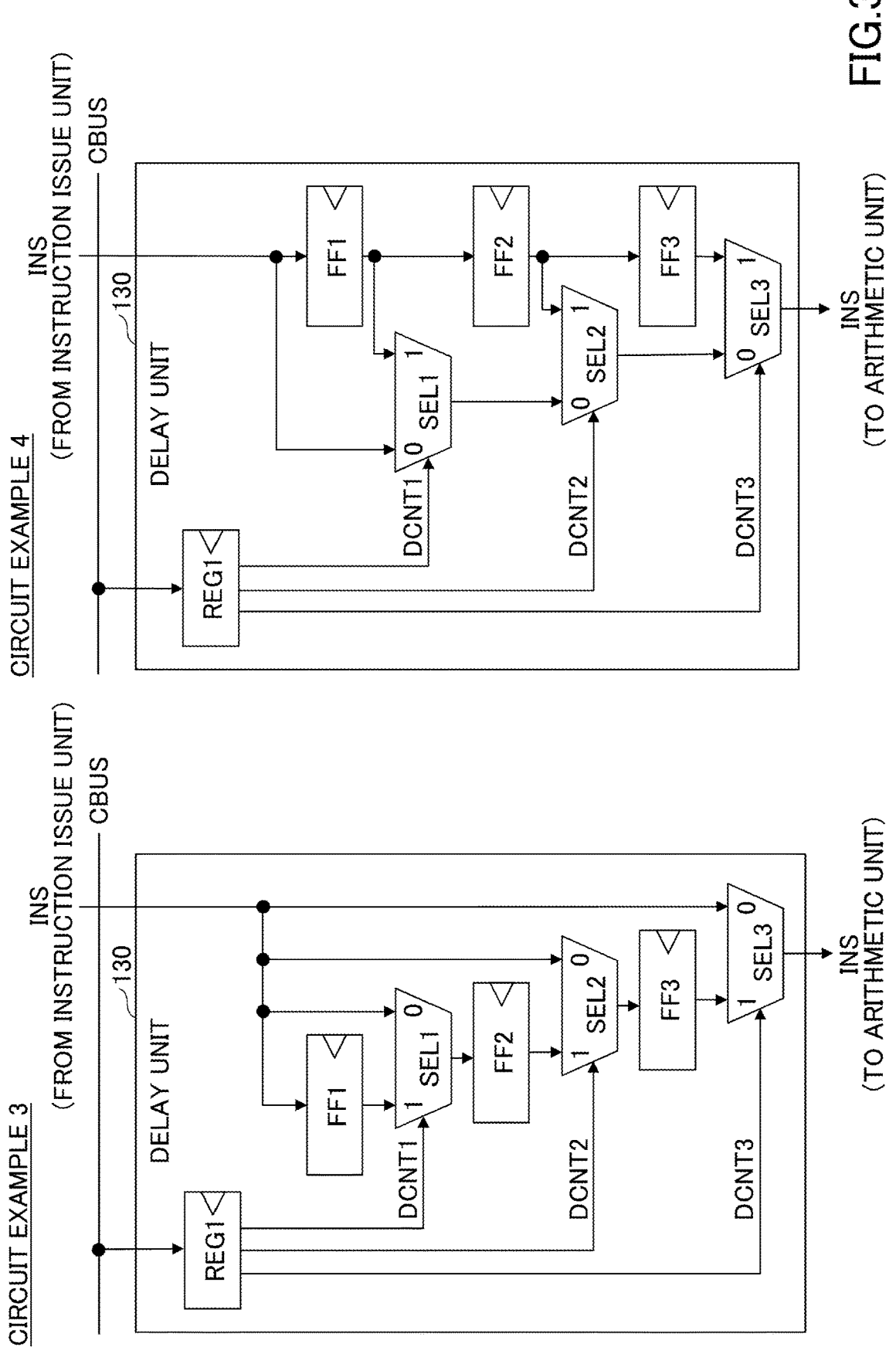
FIG. 3 is a circuit diagram illustrating another example of the delay unit of FIG. 1.

FIG. 3 is a circuit diagram illustrating another example of the delay unit 130 of FIG. 1. An element substantially the same as the element in FIG. 2 is given the same reference symbol. The delay units 130 illustrated as circuit examples 3 and 4 in FIG. 3 are substantially the same as the circuit examples 1 and 2 in FIG. 2, respectively, except that the delay units 130 each include a register REG1 instead of the program circuit PRGM. A triangle mark illustrated in the register REG1 indicates a clock input terminal.

The register REG1 stores, for example, a 3-bit logical value supplied via a control bus CBUS in a start-up sequence (start-up program) of the processor 100, and outputs the delay control signals DCNT1 to DCNT3 corresponding to the stored logical value. This allows four delay amounts from the delay amount 0 to the delay amount 3 to be set, as in FIG. 2. The register REG1 is an example of the delay amount hold unit (the delay amount hold circuit) configured to hold delay amount information indicating a delay amount to be set in the delay unit 130.

Here, instead of providing the register REG1, the delay control signal terminals DCNT1 to DCNT3 may be provided in the external terminal of the processor 100. Then, voltage levels (logical values) set at the delay control signal terminals DCNT1 to DCNT3 may be respectively supplied to the selectors SEL1 to SEL3 as the delay control signals DCNT1 to DCNT3.

Figure 4:
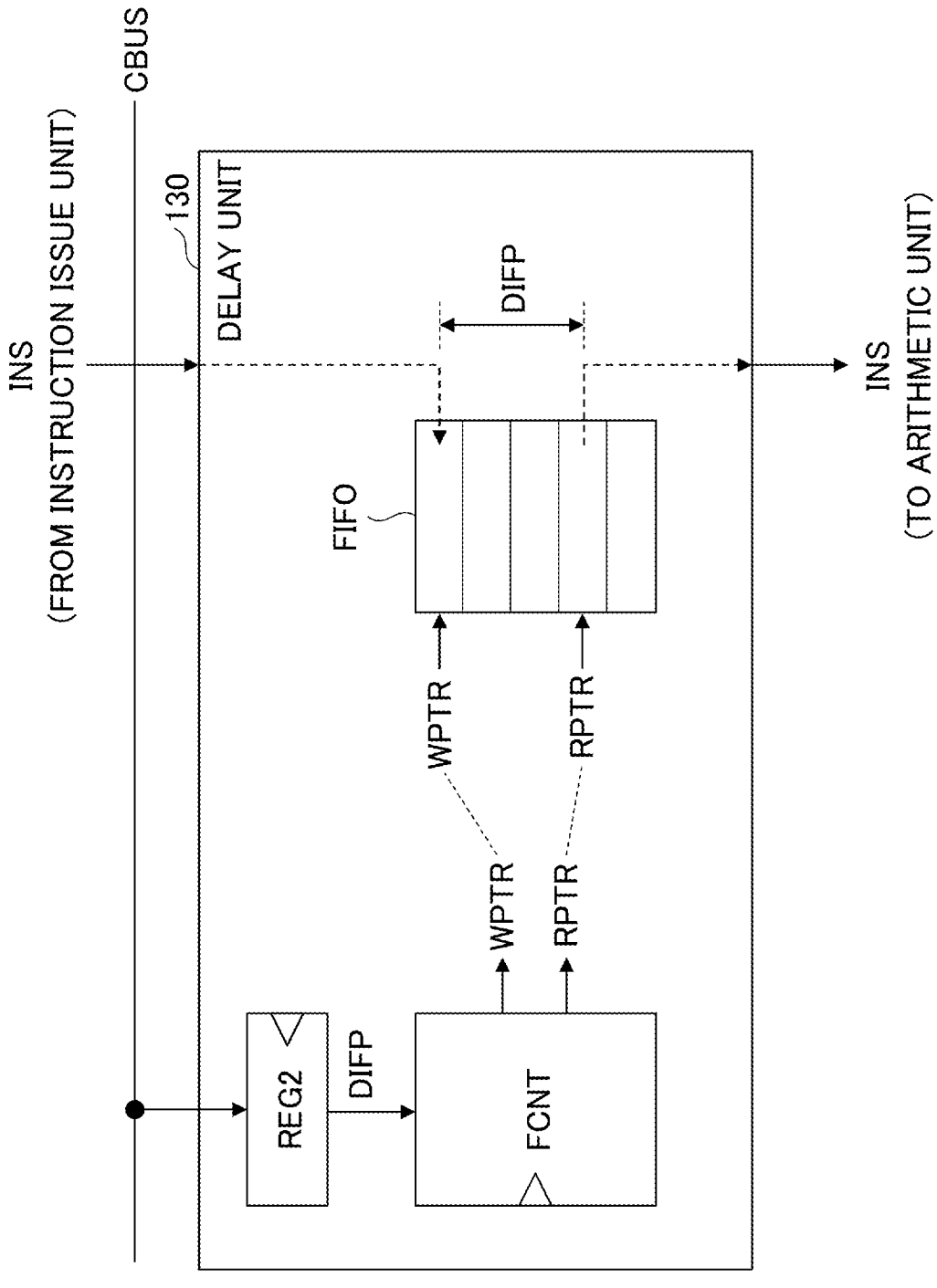
FIG. 4 is a circuit diagram illustrating still another example of the delay unit of FIG. 1.

FIG. 4 is a circuit diagram illustrating still another example of the delay unit 130 of FIG. 1. The delay unit 130 illustrated in FIG. 4 includes a first-in first-out (FIFO) queue, a register REG2, and a control circuit FCNT. The FIFO queue may be configured by a static random access memory (SRAM), may be configured by a flip-flop, or may be configured by another circuit. Triangle marks illustrated in the register REG2 and the control circuit FCNT indicate clock input terminals.

The register REG2 holds, for example, a pointer difference DIFP supplied via the control bus CBUS in the start-up sequence (start-up program) of the processor 100, and outputs the held pointer difference DIFP to the control circuit FCNT. The pointer difference DIFP is an example of the delay amount information indicating the delay amount to be set in the delay unit 130. The register REG2 is an example of the delay amount hold unit configured to hold the delay amount information.

The control circuit FCNT sequentially updates a write pointer WPTR and a read pointer RPTR having the pointer difference DIFP every time the instruction is stored in the FIFO queue in synchronization with a clock, and outputs the updated pointers to the FIFO queue. Here, the clock supplied to the control circuit FCNT may be a frequency-divided clock obtained by dividing the frequency of the operation clock of the processor.

The write pointer WPTR and the read pointer RPTR are updated in conjunction with each other, so that the difference between the write pointer WPTR and the read pointer RPTR is maintained at the pointer difference DIFP. This allows the delay unit 130 of FIG. 4 to delay outputting, to the arithmetic unit 140, the instruction INS output from the instruction issue unit 120 by a delay amount corresponding to the product of the pointer difference DIFP and the clock cycle. In other words, by setting the difference between the write pointer WPTR and the read pointer RPTR as the pointer difference DIFP, the delay unit 130 having a delay amount corresponding to a multiple number of the pointer difference DIFP can be achieved.

Here, instead of providing the register REG2, multiple external terminals in which the logical value of the pointer difference DIFP is set may be provided in the processor 100. Then, the voltage level (the logical value) set at the external terminals may be supplied to the control circuit FCNT as the pointer difference DIFP.

Figure 5:
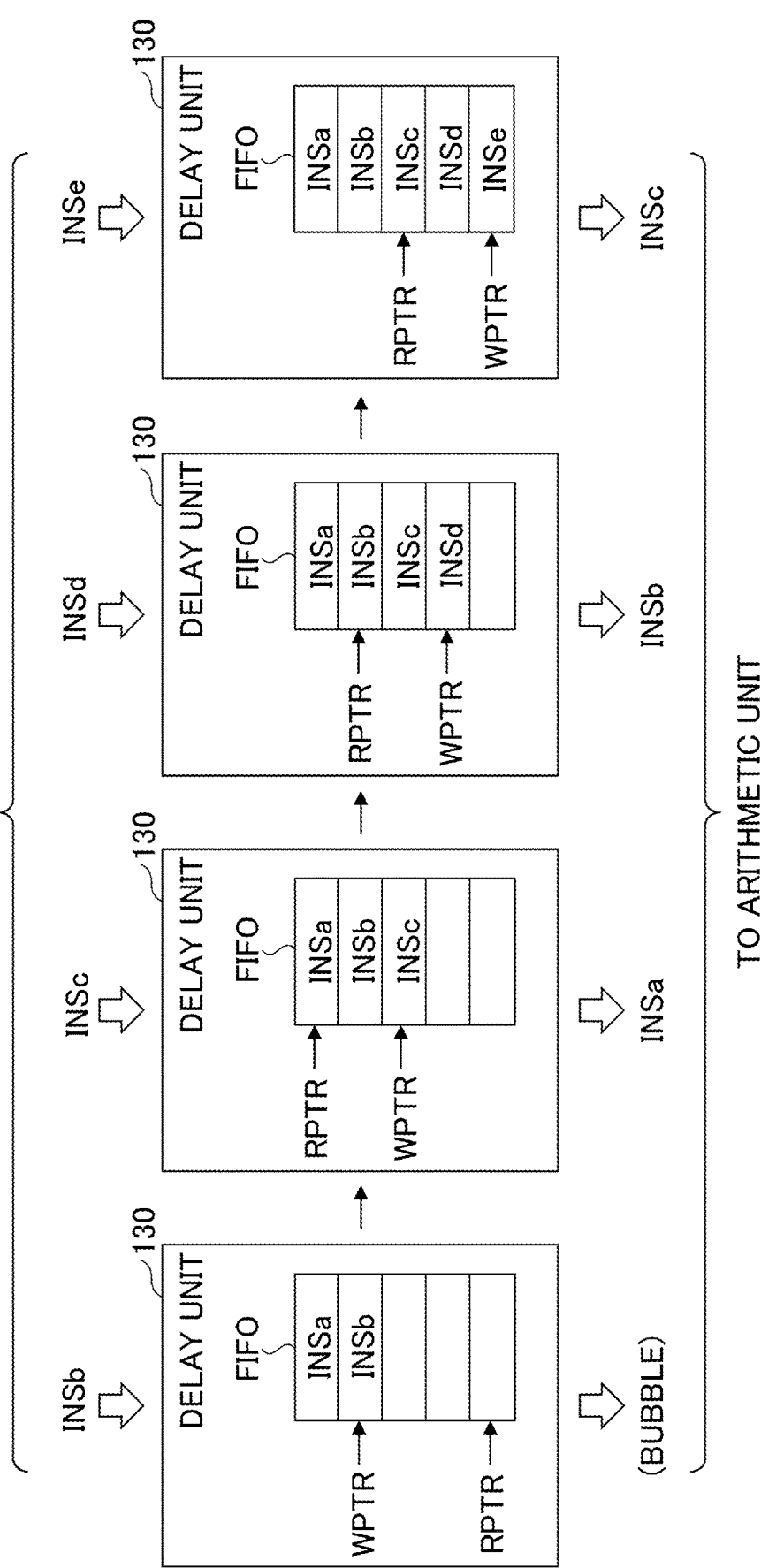
FIG. 5 is an explanatory diagram illustrating an example of an operation of the delay unit of FIG. 4.

FIG. 5 is an explanatory diagram illustrating an example of an operation of the delay unit 130 in FIG. 4. In FIG. 5, instructions INS (INSa, INSb, INSc, INSd, and INSe) are sequentially output from the instruction issue unit 120 and sequentially stored in the FIFO queue of the delay unit 130. Each of the instructions INS stored in the FIFO queue is read from the FIFO queue after two clock cycles indicated by the pointer difference DIFP, and is output to the arithmetic unit 140.

FIG. 6 is an explanatory diagram illustrating an example of the delay amount of the delay unit 130 of FIG. 1. A rectangle illustrated at the delay unit 130 indicates one unit of the delay amount. In FIG. 6, for the sake of simplicity of the description, each of the delay units 130 is set to the delay amount 1, the delay amount 2, or the delay amount 3. Here, four or more different amounts may be set as the delay amount.

In the delay unit 130 illustrated in the circuit example 1 of FIG. 2 and the circuit example 3 of FIG. 3, the delay amount 1 is set by the delay control signals DCNT1, DCNT2, and DCNT3="X, 0, 1". The delay amount 2 is set by the delay control signals DCNT1, DCNT2, and DCNT3="0, 1, 1". The delay amount 3 is set by the delay control signals DCNT1, DCNT2, and DCNT3="1, 1, 1".

In the delay unit 130 illustrated in the circuit example 2 of FIG. 2 and the circuit example 4 of FIG. 3, the delay amount 1 is set by the delay control signals DCNT1, DCNT2, and DCNT3="1, 0, 0". The delay amount 2 is set by the delay control signals DCNT1, DCNT2, and DCNT3="X, 1, 0". The delay amount 3 is set by the delay control signals DCNT1, DCNT2, and DCNT3="X, X, 1".

In the delay unit 130 of FIG. 4, the delay amount 1 is set by the pointer difference DIFP="1". The delay amount 2 is set by the pointer difference DIFP="2". The delay amount 3 is set by the pointer difference DIFP="3".

As illustrated in FIG. 6, the delay units 130 differ in the delay amount per a predetermined number of delay units 130. That is, at least two delay amounts of the delay units 130 are different from each other. Additionally, a substantially equal number of delay units 130 are set with each of the delay amounts (1, 2 or 3). In FIG. 1, the number of the delay units 130 having the delay amount 1 is three, the number of the delay units 130 having the delay amount 2 is three, and the number of the delay units 130 having the delay amount 3 is two.

Figure 7:
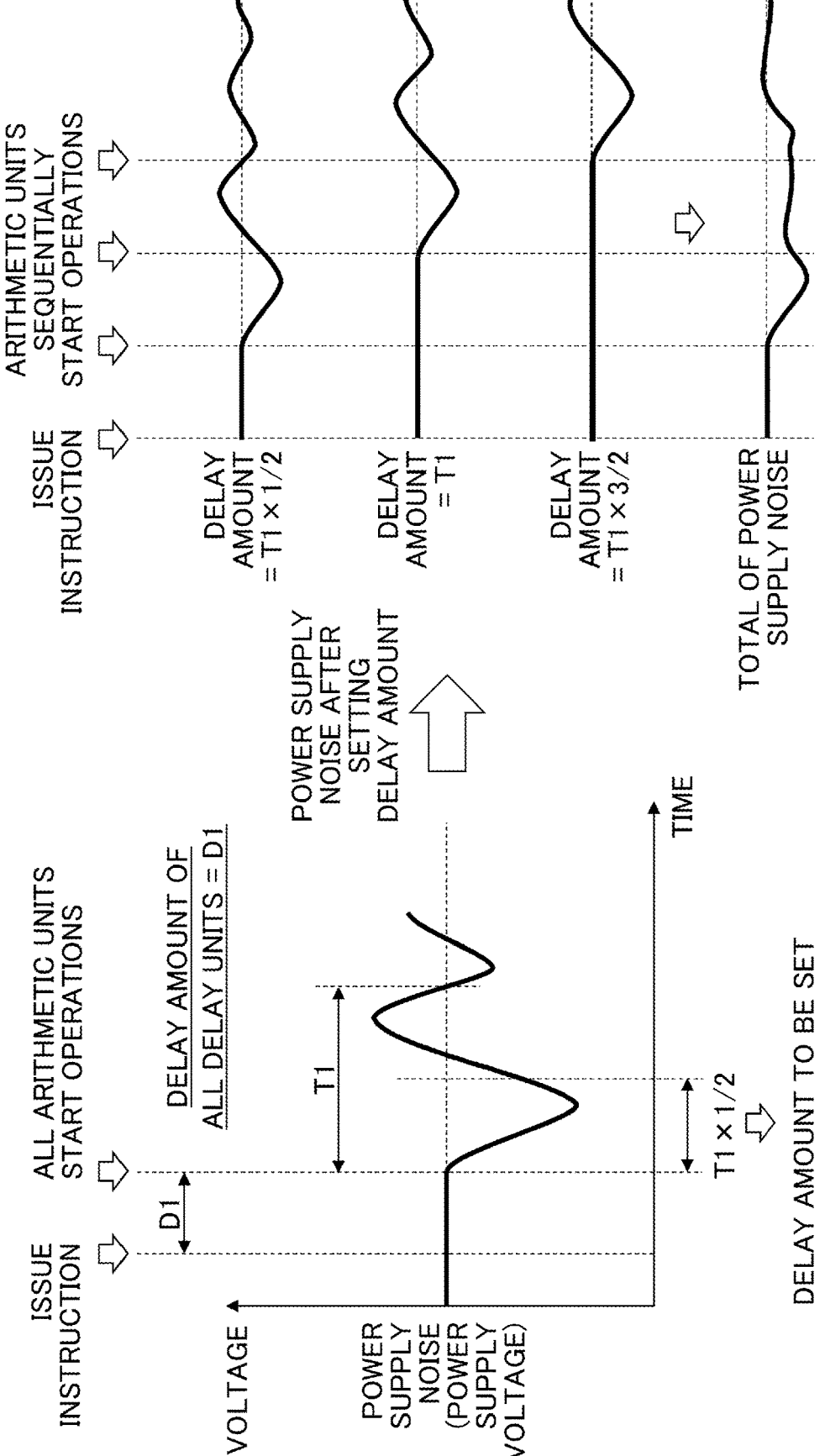
FIG. 7 is an explanatory diagram illustrating an example of a method of determining the delay amount of each of the delay units in FIG. 1.

FIG. 7 is an explanatory diagram illustrating an example of a method of determining the delay amount of each of the delay units 130 in FIG. 1. The method of determining the delay amount illustrated in FIG. 7 is performed at the time of evaluating characteristics in a development process (a prototype process) of the processor 100 or at the time of testing in a mass production process (a manufacturing process) of the processor 100.

First, the identical delay amount D1 is set in all the delay units 130. Here, the delay amount D1 may be a delay amount of 0. Next, by issuing an instruction from the instruction issue unit 120 to cause all the arithmetic units 140 to execute the instruction INS, the power supply noise is measured when all the arithmetic units 140 start operations simultaneously. For example, the power supply noise is measured as a change amount of the power supply voltage by using an LSI tester or the like.

Here, FIG. 7 indicates a waveform of a power supply noise of a main frequency among waveforms in which power supply noises of multiple frequencies are superimposed. For example, the voltage of the power supply noise (the power supply voltage) of the main frequency temporarily drops when the arithmetic unit 140 starts the operation, and then the voltage amplitude gradually decreases while repeating the rise and drop of the voltage. Here, the power supply noise of the ground voltage may be measured by an LSI tester or the like.

Next, a first period T1 of the power supply noise generated after the arithmetic unit 140 starts the operation is obtained by using the waveform of the measured power supply noise. Then, the delay amounts set in the delay units 130 are respectively set to integral multiples (1, 2, 3, . . . ) of one-half of the period T1. For example, the delay amount of each of the delay units 130 is set to the delay amount 1, the delay amount 2, or the delay amount 3 as illustrated in FIG. 6. The delay amount 1 is one-half of the period T1 of the power supply noise. The delay units 130 are divided into three groups substantially equal in number, and the delay amount 1, the delay amount 2, or the delay amount 3 is set in the delay units 130 for each of the groups.

When the delay amount of the delay units 130 of each of the groups is set to an integer multiple of one-half of the period T1 of the power supply noise, the phases of the waveforms of the power supply noises of the three groups are shifted by substantially half a cycle. This causes the waveforms of the power supply noises of the two groups, whose delay amounts are shifted by one-half of the period T1, to be substantially in opposite phases, and the waveforms cancel each other. Therefore, the amount of change in the power supply voltage (or the amount of change in the ground voltage) in the total of the power supply noises of the three groups can be reduced. That is, the power supply noise can be reduced.

By the method illustrated in FIG. 7, after multiple delay amounts are temporarily determined, the temporarily determined delay amounts are respectively set in the delay units 130, and the power supply noise of the processor 100 is evaluated. Then, when it is confirmed that the power supply noise (the amount of change in the power supply voltage) is within the predetermined range, the delay amounts to be set in the delay units 130 are finally determined. When the power supply noise is outside the predetermined range, another approach to reduce the power supply noise is performed. For example, the number of external power supply terminals or external ground terminals, such as bumps, is increased.

Here, without measuring the power supply noise illustrated in FIG. 7, the power supply noise may be measured in each of various combinations of the delay amounts by sequentially switching the delay amount of each of the delay units 130. Then, a combination of the delay amounts with the power supply noise (the amount of change in the power supply voltage) being the smallest and within the predetermined range may be set as the delay amount of the delay unit 130.

As described above, in the present embodiment, at least two delay amounts of the delay units 130 configured to delay the arrival timings of when the instructions INS issued from the instruction issue unit 120 arrive at the arithmetic unit 140 are made different from each other. This can reduce the power supply noise of the processor 100 including the arithmetic units 140 configured to execute one instruction in parallel. As a result, the malfunction of the processor 100 caused by the power supply noise can be prevented, and the reliability of the processor 100 can be improved.

The delay amount set in each of the delay units 130 is set to an integral multiple (one time, twice, three times, . . . ) of one-half of the period of the waveform of the power supply noise generated when the multiple arithmetic units 140 simultaneously start the operations. This causes the phases of the waveforms of the power supply noises generated in the arithmetic units 140, respectively corresponding to the two delay units 130 having the delay amounts shifted by one-half, to be substantially in opposite phases, and the effect of canceling the power supply noises can be enhanced.

By dividing the multiple delay units 130 into groups such that the number of the delay units 130 in each of the groups is substantially identical and setting the delay amount for each of the groups, the waveform and amplitude of the power supply noise generated in the arithmetic units 140 corresponding to each of the groups can be made substantially identical. This can further enhance the effect of canceling the phases of the waveforms of the power supply noises.

The delay amount of each of the delay units 130 can be changed, and thus, for example, the delay amount of the delay unit 130 can be set for each manufactured processor 100. By adjusting the delay amount of each of the delay units 130 by the number of flip-flops FF through which the instruction INS passes, the adjustment of the delay amount can be facilitated. Additionally, by adjusting the delay amount of each of the delay units 130 by the FIFO queue configured by the SRAM, the circuit scale of the delay unit 130 can be reduced, when the number of adjustment stages of the delay amount is large, for example.

FIG. 8 is a block diagram illustrating an example of a configuration of a processor according to another embodiment of the data processing device of the present disclosure. An element substantially the same as the element in FIG. 1 is given the same reference symbol. A processor 100A illustrated in FIG. 8 has substantially the same configuration as the processor 100 illustrated in FIG. 1 except that the processor 100A includes two delay units 130A instead of the eight delay units 130 illustrated in FIG. 1.

Each of the delay units 130A is provided corresponding to four arithmetic units 140. Each of the delay units 130A delays the instruction received from the instruction issue unit 120 for each of the corresponding arithmetic units 140, and outputs the delayed instruction to each of the corresponding arithmetic units 140.

FIG. 9 is a circuit diagram illustrating an example of the delay unit 130A of FIG. 8. An element substantially the same as the element in FIG. 2 is given the same reference symbol. The delay unit 130A includes a delay signal generation unit 131 and signal selection units 132 corresponding to the four arithmetic units 140. Here, in FIG. 9, for the sake of simplicity of description, an example in which the delay signal generation unit 131 includes three flip-flops FF and each of the signal selection units 132 includes three selectors SEL1 to SEL3 is illustrated. However, it is only necessary that the number of flip-flops FF is plural and the number of selectors SEL is plural. The delay signal generation unit 131 and the signal selection unit 132 may be implemented as a delay signal generation circuit 131 and a signal selection circuit 132.

The delay signal generation unit 131 includes multiple flip-flops FF (FF1, FF2, and FF3) connected in series. The flip-flop FF1 receives the instruction INS output from the instruction issue unit 120 and outputs the received instruction to the flip-flop FF2 and each of the signal selection units 132. The flip-flop FF2 outputs the instruction INS output from the flip-flop FF1 to the flip-flop FF3 and each of the signal selection units 132. The flip-flop FF3 outputs the instruction INS output from the flip-flop FF2 to each of the signal selection units 132.

Each of the signal selection units 132 includes multiple selectors SEL (SEL1, SEL2, and SEL3) and the program circuit PRGM. The program circuit PRGM stores the logical value of the delay control signals DCNT1 to DCNT3 and outputs the delay control signals DCNT1 to DCNT3 having the stored logical value, in a similar way to the program circuit PRGM of FIG. 2.

When the delay control signal DCNT1 is logic 1, the selector SEL1 outputs the instruction INS received from the flip-flop FF1 to the selector SEL2. When the delay control signal DCNT1 is logic 0, the selector SEL1 outputs the instruction INS received from the instruction issue unit 120 to the selector SEL2.

When the delay control signal DCNT2 is logic 1, the selector SEL2 outputs the instruction INS received from the flip-flop FF2 to the selector SEL3. When the delay control signal DCNT2 is logic 0, the selector SEL2 outputs the instruction INS received from the selector SEL1 to the selector SEL3.

When the delay control signal DCNT3 is logic 1, the selector SEL3 outputs the instruction INS received from the flip-flop FF3 to the arithmetic unit 140. When the delay control signal DCNT3 is logic 0, the selector SEL3 outputs the instruction INS received from the selector SEL2 to the arithmetic unit 140.

This allows the delay unit 130A to operate in a similar manner to the four delay units 130 illustrated in the circuit example 2 of FIG. 2. In this case, the delay unit 130A includes the flip-flops FF1 to FF3 common to the four signal selection units 132, and thus the circuit size can be reduced in comparison with the four delay units 130 illustrated in FIG. 1.

Here, the signal selection unit 132 may include the register REG1 of FIG. 3 and a control bus CBUS for supplying, to the register REG1, a 3-bit logical value corresponding to the delay control signals DCNT1 to DCNT3, instead of the program circuit PRGM.

As described above, in the present embodiment, as in the above-described embodiment, the power supply noise of the processor 100A including the arithmetic units 140 configured to execute one instruction in parallel can be reduced. As a result, the malfunction of the processor 100A caused by the power supply noise can be prevented, and the reliability of the processor 100A can be improved. Furthermore, in the present embodiment, the circuit scale of the delay unit 130A mounted on the processor 100A can be smaller than the circuit scale of the delay unit 130 mounted on the processor 100 of FIG. 1. As a result, the chip size of the processor 100A can be smaller than the chip size of the processor 100.

FIG. 10 is a block diagram illustrating an example of a configuration of a direct memory access controller (DMAC) according to another embodiment of the data processing device of the present disclosure. An element substantially the same as the element in FIG. 1 is given the same reference symbol. A DMAC 200 illustrated in FIG. 10 includes a register 210, a sequence generation and instruction issue unit 220, multiple delay units 130, and multiple data transfer execution circuits 240. Here, the sequence generation and instruction issue unit 220 may be implemented as a sequence generation and instruction issue circuit 220.

The register 210 is connected to the sequence generation and instruction issue unit 220. Information held in the register 210 can be read from the sequence generation and instruction issue unit 220. An output of the sequence generation and instruction issue unit 220 is connected in common to inputs of the delay units 130. Outputs of the delay units 130 are connected to inputs of the corresponding data transfer execution circuits 240. For example, the delay unit 130 may be any one of the delay units 130 illustrated in FIG. 2, FIG. 3, and FIG. 4.

The register 210 holds a source address, a destination address, a transfer size, a transfer pattern, and the like transferred from a CPU 300 configured to control an operation of the DMAC 200. The sequence generation and instruction issue unit 220 issues a data transfer instruction to each of the data transfer execution circuits 240 via the delay units 130 according to the information held in the register 210. Here, the source address and the destination address included in the data transfer instruction differ for each of the data transfer execution circuits 240. One or both of the transfer size and the transfer pattern included in the data transfer instruction may be common to all the data transfer execution circuits 240 or may differ for each data transfer execution circuit 240.

Each of the data transfer execution circuits 240 alternately issues, for example, a read access request and a write access request to a bus 310 according to the data transfer instruction from the sequence generation and instruction issue unit 220. This causes data to be transferred by DMA from one of the memories connected to the bus 310 to another one of the memories. The data transfer execution circuit 240 is an example of an execution circuit configured to execute the data transfer instruction.

Here, the DMAC 200 may include a descriptor instead of the register 210. In this case, the sequence generation and instruction issue unit 220 may fetch DMA transfer information (a source address, a destination address, and the like) held by the descriptor and output the data transfer instruction including the fetched information to the data transfer execution circuit 240 via the delay unit 130.

In the DMAC 200 illustrated in FIG. 10, as in the processor 100 illustrated in FIG. 1, different delay amounts are set for the groups each having the predetermined number of the delay units 130, and the number of the delay units 130 belonging to each of the plurality of groups is substantially identical. Additionally, as in FIG. 7, in the state where the same delay amount is set in all the delay units 130, the operations of all the data transfer execution circuits 240 may be started simultaneously, the period T1 of the power supply noise may be measured, and the delay amount of each of the delay units 130 may be set to an integer multiple of one-half of the period T1.

As described above, in the present embodiment, the effects substantially the same as the effects of the above-described embodiment can be obtained. For example, the power supply noise of the DMAC 200 including the data transfer execution circuits 240 configured to execute the data transfer instructions in parallel can be reduced. As a result, the malfunction of the DMAC 200 caused by the power supply noise can be prevented, and the reliability of the DMAC 200 can be improved.

By setting the delay amounts of integral multiples of one-half of the period of the waveform of the power supply noise, generated when the arithmetic units 140 simultaneously start the operations, in the respective delay units 130, the phases of the waveforms of the power supply noises respectively generated in response to the operations of the data transfer execution circuits 240 can be substantially in opposite phases. This can enhance the effect of canceling the power supply noises. By setting the delay amounts for respective groups each including substantially the same number of the delay units 130, the effect of canceling the phases of the waveforms of the power supply noises can be further enhanced.

FIG. 11 is a block diagram illustrating still another embodiment of the data processing device of the present disclosure. An element substantially the same as the element in FIG. 1 is given the same reference symbol. A data processing device 400 illustrated in FIG. 11 is, for example, a server shaped as a rack or the like. The data processing device 400 includes the instruction fetch unit 110, the instruction issue unit 120, multiple delay units 430, the multiple arithmetic units 140, and the multiple register files 150, which are substantially the same as those of the processor 100 illustrated in FIG. 1. Here, the delay unit 430 may be implemented as a delay circuit 430.

However, the instruction fetch unit 110 and the instruction issue unit 120 are mounted on one semiconductor chip CP mounted on a board BRD1, and a pair of the arithmetic unit 140 and the register file 150 is mounted on one semiconductor chip CP2 mounted on a board BRD2. The board BRD1 and the multiple boards BRD2 are stored in a rack or the like that is a housing of the data processing device 400.

For example, the delay unit 430 may be provided in an optical interface (I/F) disposed between the boards BRD1 and BRD2 to transmit a signal. In this case, the instruction issue unit 120 of the board BRD1 and the arithmetic unit 140 of the board BRD2 are connected to each other via the optical interface. The optical interface includes an optical connector, an optical cable, and an optical loop circuit provided in an optical transmission path. Each of the delay units 430 is formed by the optical loop circuit. For example, the delay amount of each of the delay units 430 is set by controlling the number of loops of the optical signal in the optical loop circuit. Here, the optical interface (that is, the delay unit 430) may be mounted on either the board BRD1 or BRD2.

The delay amounts set in the delay units 430 are set to integer multiples (one time, twice, three times, . . . ) of one-half of the period T1 of the power supply noise generated when all the arithmetic units 140 are operated simultaneously, as in FIG. 7. For example, the delay units 430 are divided into multiple groups such that the number of the delay units 430 in each of the groups is substantially identical, and the delay amounts of the delay units 430 are set to be different for each of the groups.

Here, some of the boards BRD2 may be stored in a rack different from the rack illustrated in FIG. 11. In this case, the instruction issue unit 120 of the board BRD1 and the arithmetic unit 140 of the board BRD2 accommodated in another rack are also connected to each other via the delay unit 430.

Here, the semiconductor chips CP1 and CP2 may be mounted on a single board. In this case, the delay unit 430 may be mounted on the board as an individual chip, or may be mounted on either the semiconductor chip CP1 or CP2. The data processing device 400 has a board form. Additionally, the delay unit 430 may be configured by a field-programmable gate array (FPGA), an analog circuit (resistance value), or the like instead of the optical interface.

As described above, in the present embodiment, the effects substantially the same as the effects of the embodiment illustrated in FIGS. 1 to 7 can be obtained. Furthermore, in the data processing device 400 illustrated in FIG. 11, the power supply noise of the power supply voltage and the ground voltage supplied to the inside of the rack can be reduced. As a result, the malfunction of the data processing device 400 caused by the power supply noise can be prevented, and the reliability of the data processing device 400 can be improved.

Here, the delay units 130, 130A, and 430 of the above-described embodiments are circuits and are mounted on a semiconductor chip or a board. Additionally, in the above-described embodiments, the example in which the delay amount of the delay unit 130 or 130A is variable in accordance with the logic value stored in the program circuit PRGM or the register REG1 has been described. However, the delay amount of the delay unit 130 or 130A may be fixed to the delay amount determined by the method of determining the delay amount illustrated in FIG. 7 and the like. In this case, the delay units 130 and 130A are configured by connecting in series the flip-flops FF that are equal in number to a number corresponding to the determined delay amount, and do not include the program circuit PRGM, the register REG1, and the selector SEL illustrated in FIG. 2 and FIG. 3. For example, the delay units 130 and the 130A are built in the processors 100 and 100A as fixed circuits together with the arithmetic unit 140 and the like.

Figure 12:
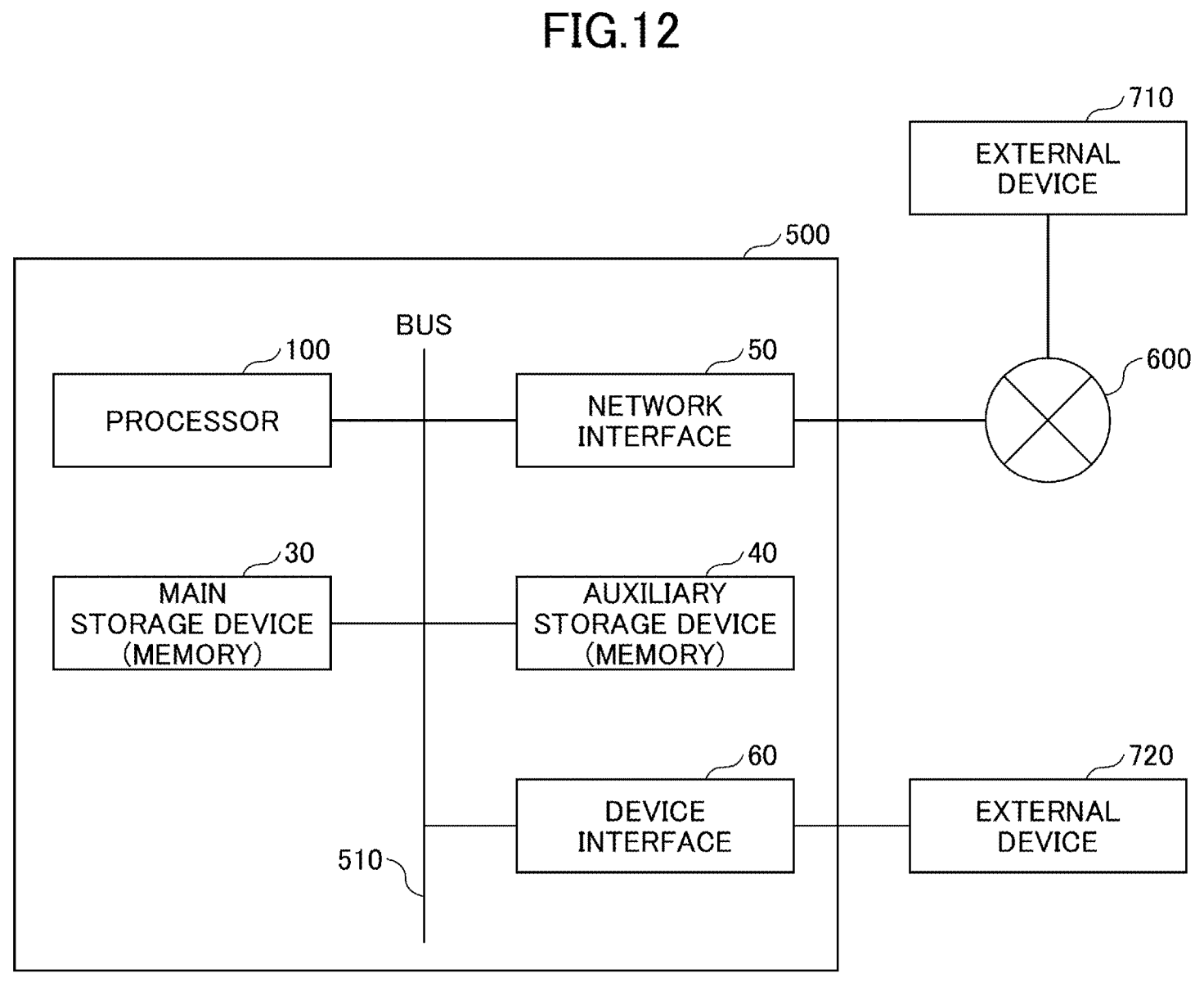

FIG. 12 is a block diagram illustrating an example of a hardware configuration of a computer in which the processor 100 illustrated in FIG. 1 is mounted. In FIG. 12, the computer may be implemented as a computer 500 including a processor 100, a main storage device 30 (a memory), an auxiliary storage device 40 (a memory), a network interface 50, and a device interface 60, which are connected via a bus 510, as an example. Here, the computer 500 may include the DMAC 200 illustrated in FIG. 10 between the processor 100 and the bus 510, in addition to the path connected to the bus 510.

The computer 500 of FIG. 12 includes one of each component, but may include two or more of the same components. Additionally, although one computer 500 is illustrated in FIG. 12, software may be installed in multiple computers, and each of the multiple computers may execute the same part or different parts of the processing of the software. In this case, a form of distributed computing in which the computers communicate with each other via the network interface 50 or the like to perform the processing may be employed. That is, a system may be configured to implement functions by one or more computers 500 executing instructions stored in one or more storage devices. Additionally, the information transmitted from a terminal may be processed by one or more computers 500 provided on a cloud, and the processing result may be transmitted to the terminal.

Various operations may be executed in parallel processing using one or more processors 100 mounted on the computer 500 or using multiple computers 500 via a network. Additionally, various operations may be distributed to multiple arithmetic cores in the processor 100 to be executed in parallel processing. Additionally, some or all of the processes, means, and the like of the present disclosure may be realized by at least one of a processor or a storage device provided on a cloud that can communicate with the computer 500 via a network. As described, each device in the above-described embodiments may be in a form of parallel computing by one or more computers.

The processor 100 may be an electronic circuit (a processing circuit, processing circuitry, a CPU, a GPU, an FPGA, an ASIC, or the like) that performs at least one of computer control or operations. Additionally, the processor 100 may be any of a general-purpose processor, a dedicated processing circuit designed to execute a specific operation, and a semiconductor device including both a general-purpose processor and a dedicated processing circuit. Additionally, the processor 100 may include an optical circuit or may include an arithmetic function based on quantum computing.

The processor 100 may perform arithmetic processing based on data or software input from each device or the like of the internal configuration of the computer 500, and may output an arithmetic result or a control signal to each device or the like. The processor 100 may control respective components constituting the computer 500 by executing an operating system (OS), an application, or the like of the computer 500.

The main storage device 30 may store instructions executed by the processor 100, various data, and the like, and information stored in the main storage device 30 may be read by the processor 100. The auxiliary storage device 40 is a storage device other than the main storage device 30. Here, these storage devices indicate any electronic components capable of storing electronic information, and may be semiconductor memories. The semiconductor memory may be either a volatile memory or a nonvolatile memory. A storage device for storing various data and the like in the computer 500 may be realized by the main storage device 30 or the auxiliary storage device 40, or may be realized by a built-in memory built in the processor 100.

When the computer 500 includes at least one storage device (memory) and at least one processor 100 connected (coupled) to the at least one storage device, the at least one processor 100 may be connected to one storage device.

Additionally, at least one storage device may be connected to one processor 100. Additionally, a configuration in which at least one processor 100 among the multiple processors 100 is connected to at least one storage device among the multiple storage devices may be included. Additionally, this configuration may be realized by storage devices and the processors 100 included in multiple computers 500. Furthermore, a configuration in which the storage device is integrated with the processor 100 (for example, an L1 cache or a cache memory including an L2 cache) may be included.

The network interface 50 is an interface for connecting to the communication network 600 by wire or wirelessly. As the network interface 50, an appropriate interface, such as one conforming to an existing communication standard, may be used. The network interface 50 may exchange information with an external device 710 connected via the communication network 600. Here, the communication network 600 may be any one of a wide area network (WAN), a local area network (LAN), a personal area network (PAN), and the like, or a combination thereof, as long as information is exchanged between the computer 500 and the external device 710. Examples of the WAN include the Internet and the like, and examples of the LAN include IEEE802.11, Ethernet (registered trademark), and the like. Examples of the PAN include Bluetooth (registered trademark), Near Field Communication (NFC), and the like.

The device interface 60 is an interface, such as a USB, that is directly connected to an external device 720.

The external device 710 is a device connected to the computer 500 via a network. The external device 720 is a device directly connected to the computer 500.

The external device 710 or the external device 720 may be, for example, an input device. The input device is, for example, a device, such as a camera, a microphone, a motion capture device, various sensors, a keyboard, a mouse, a touch panel, or the like, and gives acquired information to the computer 500. Alternatively, the device may be a device including an input unit, a memory, and a processor, such as a personal computer, a tablet terminal, or a smartphone.

Additionally, the external device 710 or the external device 720 may be, for example, an output device. The output device may be, for example, a display device, such as a liquid crystal display (LCD) or an organic electro luminescence (EL) panel, or may be a speaker that outputs sound or the like. Alternatively, the device may be a device including an output unit, a memory, and a processor, such as a personal computer, a tablet terminal, or a smartphone.

Additionally, the external device 710 or the external device 720 may be a storage device (a memory). For example, the external device 710 may be a network storage or the like, and the external device 720 may be a storage, such as an HDD.

Additionally, the external device 710 or the external device 720 may be a device having some functions of the components of the computer 500. That is, the computer 500 may transmit a part or all of the processing result to the external device 710 or the external device 720, or may receive a part or all of the processing result from the external device 710 or the external device 720.

In the present specification (including the claims), if the expression "at least one of a, b, and c" or "at least one of a, b, or c" is used (including similar expressions), any one of a, b, c, a-b, a-c, b-c, or a-b-c is included. Multiple instances may also be included in any of the elements, such as a-a, a-b-b, and a-a-b-c-c. Further, the addition of another element other than the listed elements (i.e., a, b, and c), such as adding d as a-b-c-d, is included.

In the present specification (including the claims), if the expression such as "in response to data being input", "using data", "based on data", "according to data", or "in accordance with data" (including similar expressions) is used, unless otherwise noted, a case in which the data itself is used and a case in which data obtained by processing the data (e.g., data obtained by adding noise, normalized data, a feature amount extracted from the data, and intermediate representation of the data) is used are included. If it is described that any result can be obtained "in response to data being input", "using data", "based on data", "according to data", or "in accordance with data" (including similar expressions), unless otherwise noted, a case in which the result is obtained based on only the data is included, and a case in which the result is obtained affected by another data other than the data, factors, conditions, and/or states may be included. If it is described that "data is output" (including similar expressions), unless otherwise noted, a case in which the data itself is used as an output is included, and a case in which data obtained by processing the data in some way (e.g., data obtained by adding noise, normalized data, a feature amount extracted from the data, and intermediate representation of the data) is used as an output is included.

In the present specification (including the claims), if the terms "connected" and "coupled" are used, the terms are intended as non-limiting terms that include any of direct, indirect, electrically, communicatively, operatively, and physically connected/coupled. Such terms should be interpreted according to a context in which the terms are used, but a connected/coupled form that is not intentionally or naturally excluded should be interpreted as being included in the terms without being limited.

In the present specification (including the claims), if the expression "A configured to B" is used, a case in which a physical structure of the element A has a configuration that can perform the operation B, and a permanent or temporary setting/configuration of the element A is configured/set to actually perform the operation B may be included. For example, if the element A is a general purpose processor, the processor may have a hardware configuration that can perform the operation B and be configured to actually perform the operation B by setting a permanent or temporary program (i.e., an instruction). If the element A is a dedicated processor, a dedicated arithmetic circuit, or the like, a circuit structure of the processor may be implemented so as to actually perform the operation B irrespective of whether the control instruction and the data are actually attached.

In the present specification (including the claims), if a term indicating inclusion or possession (e. g., "comprising", "including", or "having") is used, the term is intended as an open-ended term, including inclusion or possession of an object other than a target object indicated by the object of the term. If the object of the term indicating inclusion or possession is an expression that does not specify a quantity or that suggests a singular number (i.e., an expression using "a" or "an" as an article), the expression should be interpreted as being not limited to a specified number.

In the present specification (including the claims), even if an expression such as "one or more" or "at least one" is used in a certain description, and an expression that does not specify a quantity or that suggests a singular number (i.e., an expression using "a" or "an" as an article) is used in another description, it is not intended that the latter expression indicates "one". Generally, an expression that does not specify a quantity or that suggests a singular number (i.e., an expression using "a" or "an" as an article) should be interpreted as being not necessarily limited to a particular number.

In the present specification, if it is described that a particular advantage/result is obtained in a particular configuration included in an embodiment, unless there is a particular reason, it should be understood that that the advantage/result may be obtained in another embodiment or other embodiments including the configuration. It should be understood, however, that the presence or absence of the advantage/result generally depends on various factors, conditions, and/or states, and that the advantage/result is not necessarily obtained by the configuration. The advantage/result is merely an advantage/result that is obtained by the configuration described in the embodiment when various factors, conditions, and/or states are satisfied, and is not necessarily obtained in the invention according to the claim that defines the configuration or a similar configuration.

In the present specification (including the claims), if multiple hardware performs predetermined processes, each of the hardware may cooperate to perform the predetermined processes, or some of the hardware may perform all of the predetermined processes. Additionally, some of the hardware may perform some of the predetermined processes while other hardware may perform the remainder of the predetermined processes. In the present specification (including the claims), if an expression such as "one or more hardware perform a first process and the one or more hardware perform a second process" is used, the hardware that performs the first process may be the same as or different from the hardware that performs the second process. That is, the hardware that performs the first process and the hardware that performs the second process may be included in the one or more hardware. The hardware may include an electronic circuit, a device including an electronic circuit, or the like.

In the present specification (including the claims), if multiple storage devices (memories) store data, each of the multiple storage devices (memories) may store only a portion of the data or may store an entirety of the data. Additionally, a configuration in which some of the multiple storage devices store data may be included.

Although the embodiments of the present disclosure have been described in detail above, the present disclosure is not limited to the individual embodiments described above. Various additions, modifications, substitutions, partial deletions, and the like can be made without departing from the conceptual idea and spirit of the invention derived from the contents defined in the claims and the equivalents thereof. For example, in the embodiments described above, if numerical values or mathematical expressions are used for description, they are presented as an example and do not limit the scope of the present disclosure. Additionally, the order of respective operations in the embodiments is presented as an example and does not limit the scope of the present disclosure.

The aspects of the present disclosure are as follows, for example.

<1>

A data processing device includes an instruction issue circuit configured to issue instructions; a plurality of execution circuits configured to execute, in parallel, the instructions issued from the instruction issue circuit; and a plurality of delay circuits configured to delay arrival timings of when the instructions issued from the instruction issue circuit arrive at the plurality of execution circuits, the plurality of delay circuits being arranged between the instruction issue circuit and the plurality of execution circuits. The arrival timings of the instructions arriving at at least two execution circuits included in the plurality of execution circuits are different from each other.

<2>

In the data processing device described in <1>, a difference between delay amounts of the plurality of delay circuits is an integer multiple of one-half of a period of a waveform of power supply noise generated when the plurality of execution circuits simultaneously start operations.

<3>

In the data processing device described in <2>, the number of delay circuits among the plurality of delay circuits in which each of different values in the delay amounts is set is substantially identical.

<4>

The data processing device described in one of <1> to <3> further includes a delay amount hold circuit configured to hold delay amount information indicating delay amounts to be set in the plurality of delay circuits. The delay amounts respectively set in the plurality of delay circuits are set according to the delay amount information held by the delay amount hold circuit.

<5>

In the data processing device described in <4>, each of the plurality of delay circuits includes a plurality of flip-flops connected in series, and the number of plurality of flip-flops connected in series is set according to the delay amount information held by the delay amount hold circuit.

<6>

In the data processing device described in <4>, each of the plurality of delay circuits includes a FIFO queue that is controlled by a write pointer and a read pointer and that is configured by a memory. The write pointer and the read pointer are updated in conjunction with each other every time an instruction among the plurality of instructions is stored in the FIFO queue. Each of the delay amounts of the plurality of delay circuits is set by a difference between a value of the write pointer and a value of the read pointer.

<7>

In the data processing device described in one of <1> to <3>, the plurality of execution circuits operate in synchronization with a clock having a first frequency. A time difference of the arrival timings of when the instructions delayed by at least two delay circuits included in the plurality of delay circuits arrive at the at least two execution circuits is at least one period of the clock.

<8>

In the data processing device described in one of <1> to <3>, the instruction issue circuit issues an arithmetic instruction, and each of the plurality of execution circuits is an arithmetic circuit configured to execute an arithmetic operation based on the arithmetic instruction.

<9>

In the data processing device described in one of <1> to <3>, the instruction issue circuit issues a data transfer instruction, and each of the plurality of execution circuits is a data transfer execution circuit configured to execute data transfer based on the data transfer instruction.

<10>

In the data processing device described in one of <1> to <3>, the instruction issue circuit, the plurality of execution circuits, and the plurality of delay circuits are mounted in one semiconductor chip.

<11>

In the data processing device described in one of <1> to <3>, the instruction issue circuit and the plurality of execution circuits are mounted on different semiconductor chips.

<12>

The data processing device described in one of <1> to <3> further includes a plurality of boards, at least one semiconductor chip being mounted on each of the plurality of boards. The instruction issue circuit and the plurality of execution circuits are mounted on semiconductor chips of different boards among the plurality of boards.

<13>

In the data processing device described in claim 1, the instruction issue circuit is configured to output the instructions to the plurality of delay circuits in parallel.

<14>

In the data processing device described in claim 1, the instructions issued from the instruction issue circuit are configured to arrive at the plurality of execution circuits through the plurality of delay circuits, respectively.

<15>

In the data processing device described in claim 1, the plurality of execution circuits and the plurality of delay circuits have one-to-one correspondence.

<16>

In the data processing device described in claim 1, the plurality of execution circuits and the plurality of delay circuits have many-to-one correspondence.

<17>

In the data processing device described in claim 1, a simultaneous start of execution of the instructions by the plurality of execution circuits is avoided by delay of the arrival timings.

<18>

A data processing device includes an instruction issue circuit configured to issue instructions; a plurality of execution circuits configured to execute, in parallel, the instructions issued from the instruction issue circuit, respectively; and a plurality of delay circuits being arranged between the instruction issue circuit and the plurality of execution circuits. The plurality of delay circuits are configured to prevent the plurality of execution circuits from starting simultaneously to execute the instructions, by delaying arrival timings of when the instructions issued from the instruction issue circuit arrive at the plurality of execution circuits.

<19>

In the data processing device described in claim 18, the delaying arrival timings causes different arrival timings of the instructions with respect to at least two of the plurality of execution circuits.

<20>

A method executed on a data processing device, includes issuing, by an instruction issue circuit, instructions to be executed respectively by a plurality of execution circuits; delaying, by a plurality of delay circuits being arranged between the instruction issue circuit and the plurality of execution circuits, arrival timings of when the issued instructions arrive at the plurality of execution circuits, the arrival timings of the instructions arriving at at least two execution circuits included in the plurality of execution circuits are different from each other; and executing in parallel, by the plurality of execution circuits, the arrived instructions.

What is claimed is:

1. A data processing device comprising:

an instruction issue circuit configured to issue an instruction that specifies at least a type of data operation;

a plurality of execution circuits, each configured to receive the instruction issued by the instruction issue circuit and to execute, in parallel, the data operation of the type specified by the instruction; and a plurality of delay circuits configured to stagger respective arrival timings at which the instruction issued by the instruction issue circuit arrives at corresponding execution circuits of the plurality of execution circuits, by delaying the instruction that specifies the type of the data operation and that is issued by the instruction issue circuit, each of the plurality of delay circuits being arranged between the instruction issue circuit and a corresponding execution circuit of the plurality of execution circuits, wherein the plurality of delay circuits are configured to delay the instruction that specifies the type of the data operation by respective delay amounts, the respective delay amounts being set in the plurality of delay circuits based on an evaluation of power supply noise of the data processing device during the data operation by the plurality of execution circuits.

2. The data processing device as claimed in claim 1, wherein a difference between delay amounts of the plurality of delay circuits is an integer multiple of one-half of a period of a waveform of power supply noise generated when the plurality of execution circuits simultaneously start operations.

3. The data processing device as claimed in claim 2, wherein a number of delay circuits among the plurality of delay circuits in which each of different values in the delay amounts is set is substantially identical.

4. The data processing device as claimed in claim 1, further comprising a delay amount hold circuit configured to hold delay amount information indicating delay amounts to be set in the plurality of delay circuits, wherein the delay amounts respectively set in the plurality of delay circuits are set according to the delay amount information held by the delay amount hold circuit.

5. The data processing device as claimed in claim 4, wherein each of the plurality of delay circuits includes N flip-flops connected in series, and set, from among the N flip-flops, a number of flip-flops corresponding to the delay amount information held by the delay amount hold circuit to delay the instruction that specifies the type of the data operation, a rest of the N flip-flops being not used to delay the instruction.

6. The data processing device as claimed in claim 4, wherein each of the plurality of delay circuits includes a first-in first-out (FIFO) queue that is controlled by a write pointer and a read pointer and that is configured by a memory, wherein the write pointer and the read pointer are updated in conjunction with each other every time an instruction among the instructions is stored in the FIFO queue, and wherein each of the delay amounts of the plurality of delay circuits is set by a difference between a value of the write pointer and a value of the read pointer.

7. The data processing device as claimed in claim 1, wherein the plurality of execution circuits operate in synchronization with a clock having a first frequency, and wherein a time difference of the respective arrival timings at which the instruction delayed by the plurality of delay circuits arrives at the corresponding execution circuits of the plurality of execution circuits is at least one period of the clock.

8. The data processing device as claimed in claim 1, wherein the instruction issue circuit issues, as the instruction that specifies the type of the data operation, an arithmetic instruction that specifies an arithmetic operation, and each of the plurality of execution circuits is an arithmetic circuit configured to execute, as the data operation of the type specified by the instruction, the arithmetic operation based on the arithmetic instruction.

9. The data processing device as claimed in claim 1, wherein the instruction issue circuit issues, as the instruction that specifies the type of the data operation, a data transfer instruction that specifies a data transfer, and each of the plurality of execution circuits is a data transfer execution circuit configured to execute, as the data operation of the type specified by the instruction, the data transfer based on the data transfer instruction.

10. The data processing device as claimed in claim 1, wherein the instruction issue circuit, the plurality of execution circuits, and the plurality of delay circuits are mounted in one semiconductor chip.

11. The data processing device as claimed in claim 1, wherein the instruction issue circuit and the plurality of execution circuits are mounted on different semiconductor chips.

12. The data processing device as claimed in claim 1, further comprising a plurality of boards, at least one semiconductor chip being mounted on each of the plurality of boards, wherein the instruction issue circuit and the plurality of execution circuits are mounted on semiconductor chips of different boards among the plurality of boards.

13. The data processing device as claimed in claim 1, wherein the instruction issue circuit is configured to output the instruction to the plurality of delay circuits in parallel.

14. The data processing device as claimed in claim 1, wherein the instruction issued by the instruction issue circuit arrives at the plurality of execution circuits through the plurality of delay circuits, respectively.

15. The data processing device as claimed in claim 1, wherein the plurality of execution circuits and the plurality of delay circuits have one-to-one correspondence.

16. The data processing device as claimed in claim 1, wherein the plurality of execution circuits and the plurality of delay circuits have many-to-one correspondence.

17. The data processing device as claimed in claim 1, wherein a simultaneous start of execution of the instruction by the plurality of execution circuits is avoided by the staggering of the arrival timings.

18. The data processing device as claimed in claim 1, further comprising a plurality of register files connected to the plurality of execution circuits on a one-to-one basis, each of the plurality of register files being dedicated for use by a corresponding execution circuit among the plurality of execution circuits.

19. The data processing device as claimed in claim 1, wherein the instruction further specifies at least one of a source address of data or a destination address of data.

20. The data processing device as claimed in claim 1, wherein the evaluation of the power supply noise includes measuring a waveform corresponding to the power supply noise.

21. The data processing device as claimed in claim 1, wherein the delay amounts of the plurality of delay circuits are respectively set from among at least three delay amounts based on the evaluation.

22. The data processing device as claimed in claim 1, wherein the plurality of delay circuits are divided into at least three groups, delay amounts of delay circuits in a first group being same as a first delay amount, delay amounts of delay circuits in a second group being same as a second delay amount, delay amounts of delay circuits in a third group being same as a third delay amount, and the first delay amounts, the second delay amounts, and the third delay amounts being different from each other.

23. The data processing device claimed in claim 1, further comprising a branching path extending from the instruction issue circuit to the plurality of execution circuits, each of the plurality of delay circuits being arranged between a branching point and the corresponding execution circuit of the plurality of execution circuits in a corresponding branch.

24. The data processing device claimed in claim 1, wherein the data processing device is a single instruction multiple data (SIMD) type processor or a single instruction multiple threads (SIMT) type processor.

25. The data processing device claimed in claim 1, further comprising an instruction fetch circuit configured to fetch the instruction held in a memory or a cache, and transfer the fetched instruction to the instruction issue circuit, wherein the instruction issue circuit includes an instruction decoder configured to decode the fetched instruction transferred from the instruction fetch circuit.

26. The data processing device claimed in claim 1, wherein each of the plurality of delay circuits is configured to receive a clock signal whose frequency is related to that of an operation clock of the plurality of execution circuits, and delay the instruction based on the clock signal.

27. The data processing device claimed in claim 1, wherein each of the plurality of delay circuits is formed by an optical circuit.

28. A data processing device comprising:
an instruction issue circuit configured to issue a first instruction that specifies at least a type of data operation;
a plurality of execution circuits, each configured to receive the first instruction issued by the instruction issue circuit and to execute, in parallel, the data operation of the type specified by the first instruction; and
a plurality of delay circuits, each configured to be arranged between the instruction issue circuit and a corresponding execution circuit of the plurality of execution circuits and to delay an arrival timing at which the first instruction that specifies the type of the data operation and that is issued by the instruction issue circuit arrives at the corresponding execution circuit of the plurality of execution circuits,
wherein the plurality of delay circuits are configured to prevent the plurality of execution circuits from starting simultaneously to execute the first instruction, by staggering respective arrival timings at which the first instruction issued by the instruction issue circuit arrives at corresponding execution circuits of the plurality of execution circuits, and
wherein the plurality of delay circuits are configured to delay the first instruction by respective delay amounts that are determined based on an evaluation of power supply noise of the data processing device during the data operation by the plurality of execution circuits.

29. The data processing device as claimed in claim 28, wherein at least two of the plurality of delay circuits are configured to have different delay amounts from each other in order to make arrival timings at which the first instruction arrives at corresponding execution circuits of the plurality of execution circuits different from each other.

30. A method executed on a data processing device, comprising:
issuing, by an instruction issue circuit, an instruction that specifies at least a type of data operation to be executed by a plurality of execution circuits;
staggering, by a plurality of delay circuits each being arranged between the instruction issue circuit and a corresponding execution circuit of the plurality of execution circuits, respective arrival timings at which the instruction that specifies the type of the data operation and that is issued by the instruction issue circuit arrives at corresponding execution circuits of the plurality of execution circuits, wherein the plurality of delay circuits delay the instruction by respective delay amounts, the respective delay amounts being set in the plurality of delay circuits based on an evaluation of power supply noise of the data processing device during the data operation by the plurality of execution circuits; and
executing in parallel, by the plurality of execution circuits, the data operation of the type specified by the instruction.

* * * * *